US012724414B2

(12) United States Patent
Iwahori

(10) Patent No.: US 12,724,414 B2
(45) Date of Patent: Sep. 1, 2026

(54) CONTROL DEVICE AND CONTROL SYSTEM

(71) Applicant: TOYOTA JIDOSHA KABUSHIKI KAISHA, Toyota (JP)

(72) Inventor: Kento Iwahori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 70 days.

(21) Appl. No.: 18/822,776

(22) Filed: Sep. 3, 2024

(65) Prior Publication Data

US 2025/0208616 A1 Jun. 26, 2025

(30) Foreign Application Priority Data

Dec. 20, 2023 (JP) ................................ 2023-214492

(51) Int. Cl.
*G05D 1/221* (2024.01)
*G05D 1/244* (2024.01)
*G05D 107/70* (2024.01)
*G05D 109/10* (2024.01)

(52) U.S. Cl.
CPC .......... *G05D 1/221* (2024.01); *G05D 1/2446* (2024.01); *G05D 2107/70* (2024.01); *G05D 2109/10* (2024.01)

(58) Field of Classification Search
CPC .. G05D 1/221; G05D 1/2446; G05D 2107/70; G05D 2109/10; G05D 1/6987; G05D 2105/45; G05D 2111/10; G05D 1/249
See application file for complete search history.

(56) References Cited

U.S. PATENT DOCUMENTS

| | | | | |
|---|---|---|---|---|
| 10,532,771 | B2 | 1/2020 | Nordbruch | |
| 10,682,980 | B1 * | 6/2020 | Ghamsari | G06F 21/31 |
| 2019/0047511 | A1 * | 2/2019 | Link, II | G07C 9/00309 |
| 2019/0137290 | A1 * | 5/2019 | Levy | G06Q 50/40 |
| 2020/0292406 | A1 * | 9/2020 | Son | G01M 3/24 |
| 2024/0054434 | A1 * | 2/2024 | Gariepy | G06Q 10/06313 |

FOREIGN PATENT DOCUMENTS

| | | |
|---|---|---|
| JP | 2015-165390 A | 9/2015 |
| JP | 2019-061364 A | 4/2019 |

* cited by examiner

*Primary Examiner* — Dale W Hilgendorf
*Assistant Examiner* — Frank T Glenn, III
(74) *Attorney, Agent, or Firm* — SoraIP, Inc.

(57) ABSTRACT

The control device includes: an actual data acquisition unit that acquires at least one of a mark displayed on an external monitor mounted on a moving object that can be moved by remote control, acquired information that is acquired using the mark and includes identification information for identifying the moving object; a reference data acquisition unit that acquires reference data corresponding to the actual data; and a remote control unit that remotely controls the moving object, in which a process related to the movement of the moving object is different between a case where the actual data and the reference data match and a case where the actual data and the reference data do not match.

4 Claims, 12 Drawing Sheets

FC
50
200
210
220
300,310
RG
130,
130t
MA
100,100c,100t
110
130
MA
100,100c,100n
110
RR
PL1
PL2
TR
TR
TR
GC
X
Y
Z

REMOTE CONTROL DEVICE
START
S1
ACQUIRE VEHICLE LOCATION INFORMATION USING DETECTION RESULTS FROM EXTERNAL SENSOR
S2
DETERMINE NEXT TARGET LOCATION
S3
GENERATE TRAVEL CONTROL SIGNAL
S4
SEND TRAVEL CONTROL SIGNAL TO VEHICLE
END
VEHICLE
START
S5
RECEIVE TRAVEL CONTROL SIGNAL FROM REMOTE CONTROL DEVICE
S6
CONTROL ACTUATOR USING TRAVEL CONTROL SIGNAL
END

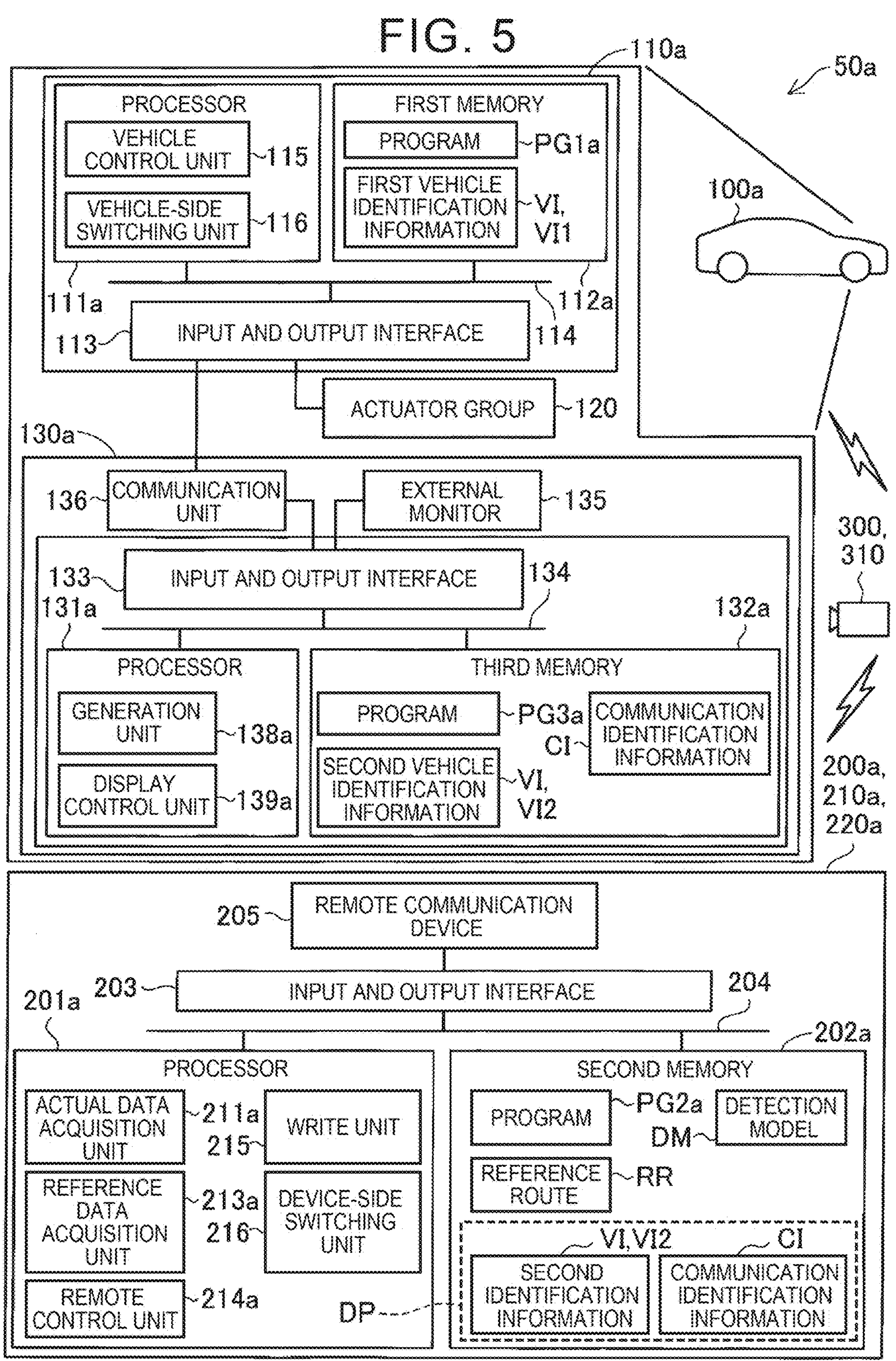
FIG. 5
110a
50a
PROCESSOR
VEHICLE CONTROL UNIT
115
VEHICLE-SIDE SWITCHING UNIT
116
FIRST MEMORY
PROGRAM
PG1a
FIRST VEHICLE IDENTIFICATION INFORMATION
VI, VI1
100a
111a
112a
113
INPUT AND OUTPUT INTERFACE
114
ACTUATOR GROUP
120
130a
136
COMMUNICATION UNIT
EXTERNAL MONITOR
135
300, 310
133
INPUT AND OUTPUT INTERFACE
134
131a
132a
PROCESSOR
GENERATION UNIT
138a
DISPLAY CONTROL UNIT
139a
THIRD MEMORY
PROGRAM
PG3a
CI
COMMUNICATION IDENTIFICATION INFORMATION
SECOND VEHICLE IDENTIFICATION INFORMATION
VI, VI2
200a, 210a, 220a
205
REMOTE COMMUNICATION DEVICE
203
INPUT AND OUTPUT INTERFACE
204
201a
202a
PROCESSOR
ACTUAL DATA ACQUISITION UNIT
211a
215
WRITE UNIT
REFERENCE DATA ACQUISITION UNIT
213a
216
DEVICE-SIDE SWITCHING UNIT
REMOTE CONTROL UNIT
214a
DP
SECOND MEMORY
PROGRAM
PG2a
DETECTION MODEL
DM
REFERENCE ROUTE
RR
VI, VI2
CI
SECOND IDENTIFICATION INFORMATION
COMMUNICATION IDENTIFICATION INFORMATION

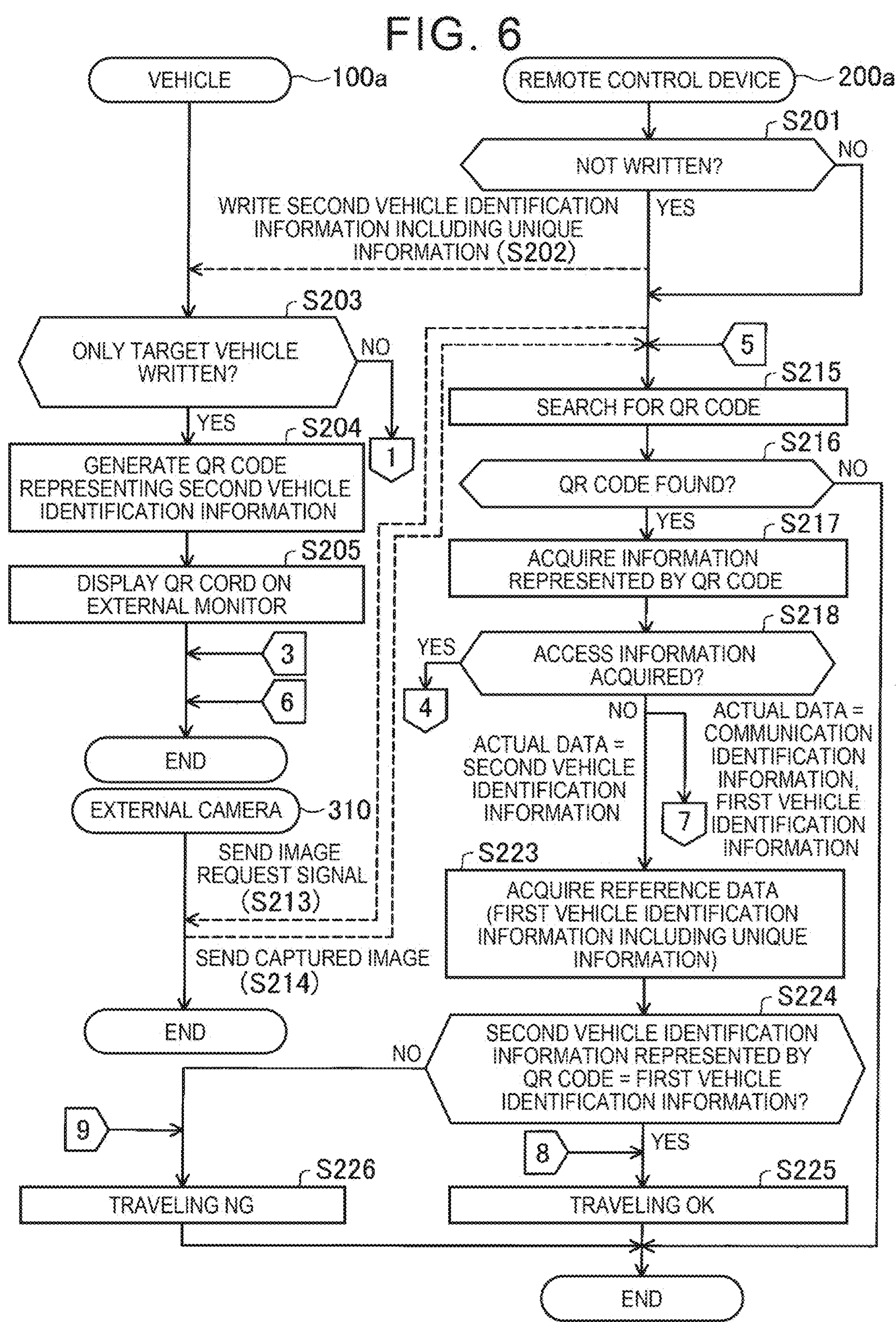
FIG. 6
VEHICLE
100a
REMOTE CONTROL DEVICE
200a
S201
NOT WRITTEN?
NO
YES
WRITE SECOND VEHICLE IDENTIFICATION INFORMATION INCLUDING UNIQUE INFORMATION (S202)
S203
ONLY TARGET VEHICLE WRITTEN?
NO
YES
1
5
S215
SEARCH FOR QR CODE
S216
QR CODE FOUND?
NO
YES
S204
GENERATE QR CODE REPRESENTING SECOND VEHICLE IDENTIFICATION INFORMATION
S217
ACQUIRE INFORMATION REPRESENTED BY QR CODE
S205
DISPLAY QR CORD ON EXTERNAL MONITOR
S218
ACCESS INFORMATION ACQUIRED?
YES
3
4
6
NO
ACTUAL DATA = SECOND VEHICLE IDENTIFICATION INFORMATION
ACTUAL DATA = COMMUNICATION IDENTIFICATION INFORMATION, FIRST VEHICLE IDENTIFICATION INFORMATION
7
END
EXTERNAL CAMERA
310
SEND IMAGE REQUEST SIGNAL (S213)
S223
ACQUIRE REFERENCE DATA (FIRST VEHICLE IDENTIFICATION INFORMATION INCLUDING UNIQUE INFORMATION)
SEND CAPTURED IMAGE (S214)
END
S224
SECOND VEHICLE IDENTIFICATION INFORMATION REPRESENTED BY QR CODE = FIRST VEHICLE IDENTIFICATION INFORMATION?
NO
9
8
YES
S226
TRAVELING NG
S225
TRAVELING OK
END

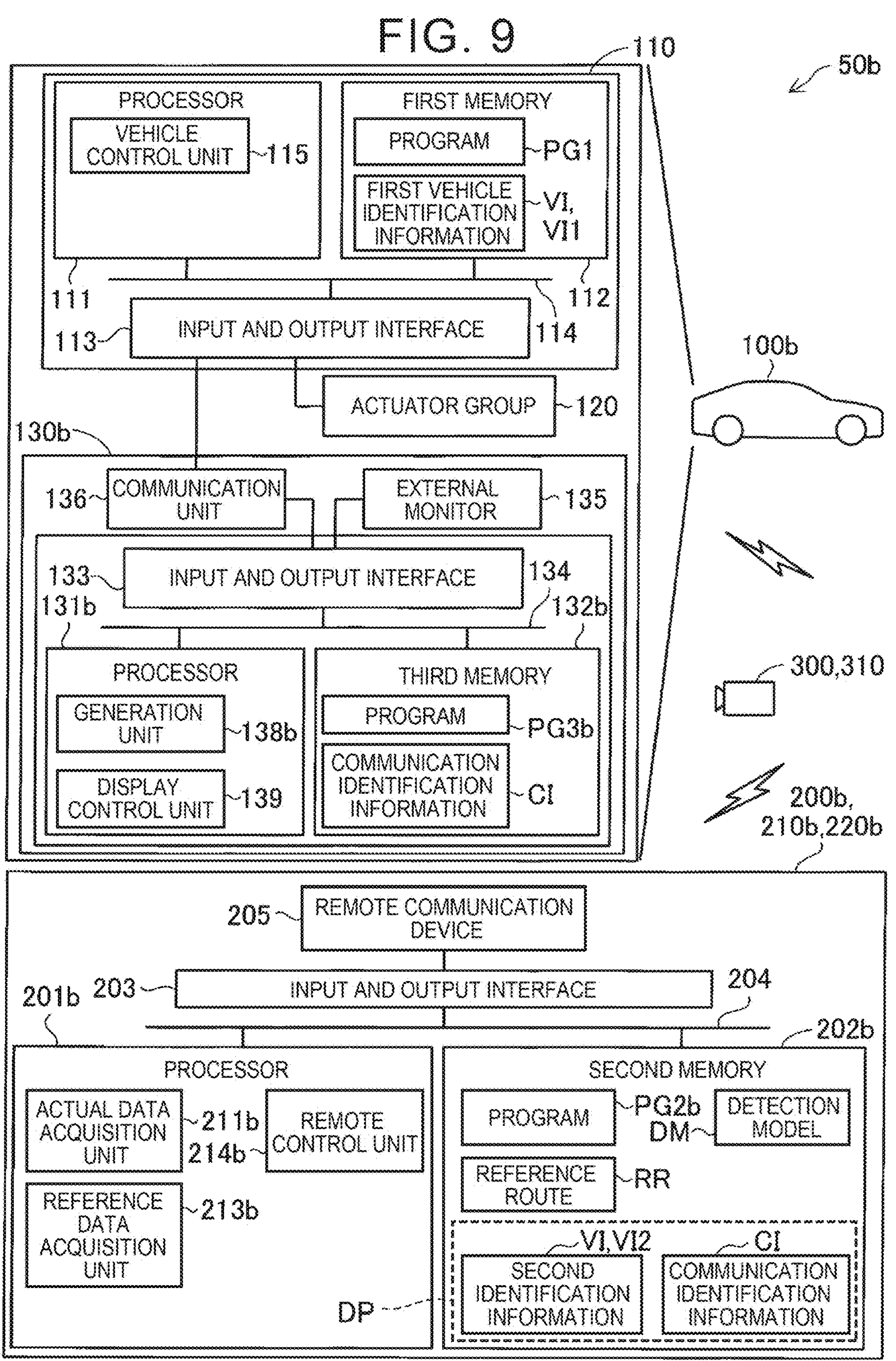
FIG. 9
110
50b
PROCESSOR
VEHICLE CONTROL UNIT
115
FIRST MEMORY
PROGRAM
PG1
FIRST VEHICLE IDENTIFICATION INFORMATION
VI, VI1
111
112
INPUT AND OUTPUT INTERFACE
113
114
100b
ACTUATOR GROUP
120
130b
COMMUNICATION UNIT
136
EXTERNAL MONITOR
135
INPUT AND OUTPUT INTERFACE
133
134
131b
132b
PROCESSOR
GENERATION UNIT
138b
DISPLAY CONTROL UNIT
139
THIRD MEMORY
PROGRAM
PG3b
COMMUNICATION IDENTIFICATION INFORMATION
CI
300,310
200b, 210b,220b
REMOTE COMMUNICATION DEVICE
205
INPUT AND OUTPUT INTERFACE
203
204
201b
202b
PROCESSOR
ACTUAL DATA ACQUISITION UNIT
211b
REMOTE CONTROL UNIT
214b
REFERENCE DATA ACQUISITION UNIT
213b
DP
SECOND MEMORY
PROGRAM
PG2b
DETECTION MODEL
DM
REFERENCE ROUTE
RR
VI,VI2
CI
SECOND IDENTIFICATION INFORMATION
COMMUNICATION IDENTIFICATION INFORMATION

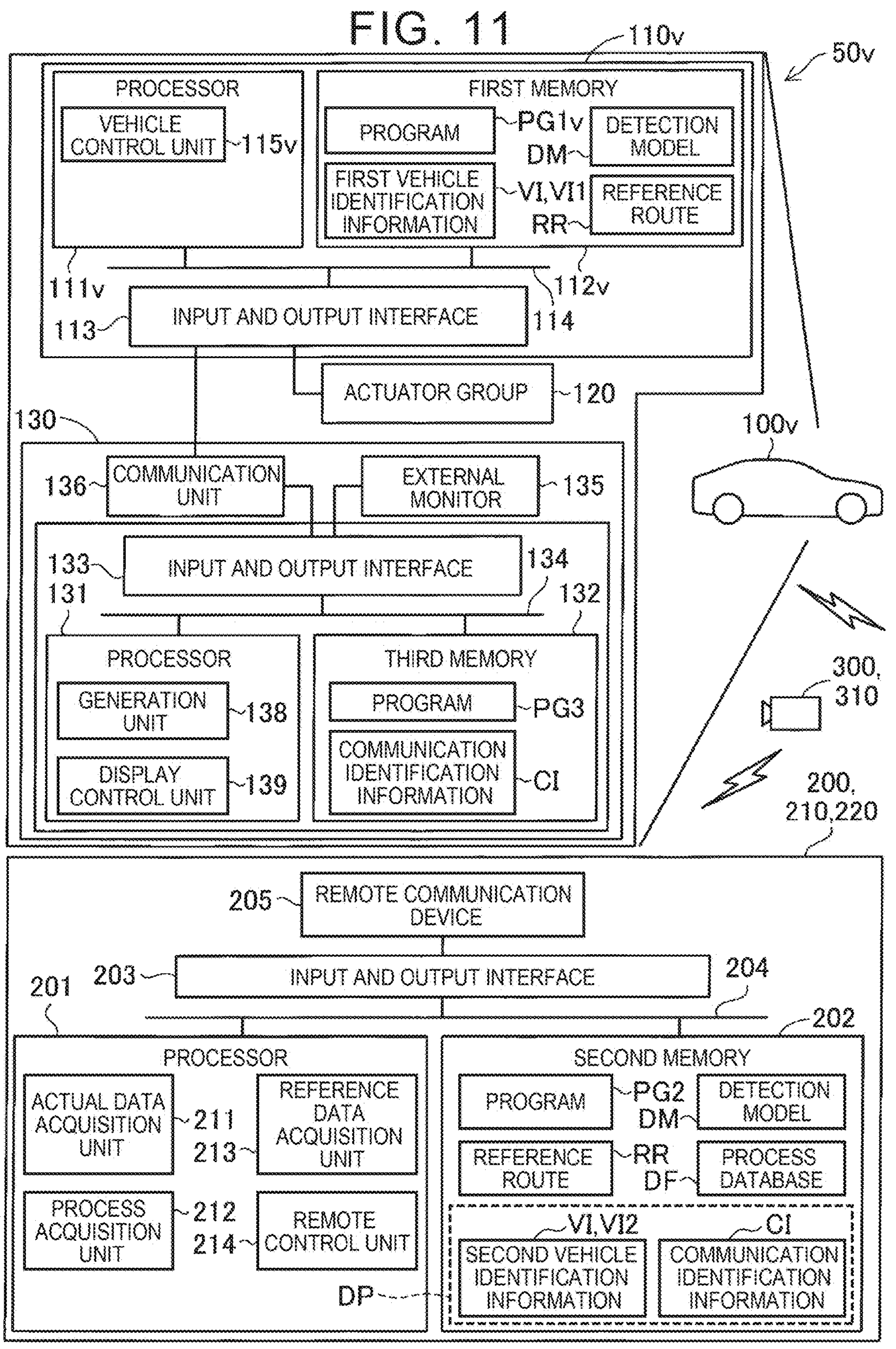
FIG. 11
110v
50v
PROCESSOR
VEHICLE CONTROL UNIT
115v
FIRST MEMORY
PROGRAM
PG1v
DETECTION MODEL
DM
FIRST VEHICLE IDENTIFICATION INFORMATION
VI, VI1
REFERENCE ROUTE
RR
111v
112v
113
INPUT AND OUTPUT INTERFACE
114
ACTUATOR GROUP
120
130
100v
136
COMMUNICATION UNIT
EXTERNAL MONITOR
135
133
INPUT AND OUTPUT INTERFACE
134
131
132
PROCESSOR
THIRD MEMORY
GENERATION UNIT
138
PROGRAM
PG3
DISPLAY CONTROL UNIT
139
COMMUNICATION IDENTIFICATION INFORMATION
CI
300, 310
200, 210,220
205
REMOTE COMMUNICATION DEVICE
201
203
INPUT AND OUTPUT INTERFACE
204
202
PROCESSOR
SECOND MEMORY
ACTUAL DATA ACQUISITION UNIT
211
213
REFERENCE DATA ACQUISITION UNIT
PROGRAM
PG2
DETECTION MODEL
DM
REFERENCE ROUTE
RR
DF
PROCESS DATABASE
PROCESS ACQUISITION UNIT
212
214
REMOTE CONTROL UNIT
VI, VI2
CI
SECOND VEHICLE IDENTIFICATION INFORMATION
COMMUNICATION IDENTIFICATION INFORMATION
DP

CONTROL DEVICE AND CONTROL SYSTEM

CROSS-REFERENCE TO RELATED APPLICATION

This application claims priority to Japanese Patent Application No. 2023-214492 filed on Dec. 20, 2023, incorporated herein by reference in its entirety.

BACKGROUND

1. Technical Field

The present disclosure relates to control devices and control systems.

2. Description of Related Art

A technique of confirming that remote control is performed on a desired vehicle has been known in the art. In this technique, a vehicle to be remotely controlled is instructed to perform a predetermined operation, and whether the instructed operation has been performed is detected using a sensor installed outside the vehicle (U.S. Pat. No. 10,532,771).

SUMMARY

In the related art, there may be a case where a non-target vehicle that is present near a target vehicle instructed to perform a predetermined operation performs the same operation as the target vehicle for some reason. In particular, when the instructed operation is a standard operation of a vehicle such as an operation to turn on vehicle lights, the non-target vehicle may perform the same operation as the target vehicle. When the non-target vehicle performs the same operation as the target vehicle, whether the instruction was successfully sent to the target vehicle may not be able to be appropriately determined. Not only vehicles but also moving objects have the same issue.

The present disclosure can be implemented in the following aspects.

(1) A first aspect of the present disclosure provides a control device. The control device includes: an actual data acquisition unit configured to acquire actual data on either or both of a mark displayed on an external monitor mounted on a moving object that is movable by remote control and acquired information acquired using the mark, the acquired information including identification information for identifying the moving object;

a reference data acquisition unit configured to acquire reference data corresponding to the actual data; and a remote control unit configured to remotely control the moving object and configured to perform different processes related to movement of the moving object between when the actual data and the reference data match each other and when the actual data and the reference data do not match each other. According to this aspect, the control device compares the actual data acquired using the mark with the reference data. This allows the control device to determine whether an instruction can be sent to the moving object to be controlled, without detecting whether an operation instructed to the moving object to be controlled has been performed. The control device can therefore more appropriately determine whether an instruction can be sent to the moving object to be controlled. The control device can also perform different processes related to movement of the moving object between when the actual data and the reference data match each other and when the actual data and the reference data do not match each other. That is, the control device can perform different processes related to movement of the moving object depending on the determination result as to whether an instruction can be sent to the moving object.

(2) In the above aspect, the identification information may be stored in each of a first memory of a moving object control device mounted on the moving object and a second memory of the control device.

An item of first identification information that is the identification information stored in the first memory may have been set according to a manufacturing process being performed on the moving object.

The control device may further include a process acquisition unit configured to acquire process information indicating the manufacturing process being performed on the moving object.

When the actual data acquisition unit acquires, as the actual data, the first identification information represented by the mark, the reference data acquisition unit may acquire, as the reference data, at least information on the item according to the manufacturing process identified by the process information out of second identification information that is the identification information stored in the second memory. According to this aspect, when the first identification information represented by the mark is acquired as the actual data, the control device can acquire, as the reference data, the information on the item according to the manufacturing process identified by the process information out of the second identification information. With this configuration, the control device can acquire information on an necessary item as the reference data when comparing the actual data with the reference data.

(3-1) In the above aspect, the identification information may be stored in each of a first memory of a moving object control device mounted on the moving object and a second memory of the control device.

When the mark is generated using at least first identification information that is the identification information stored in the first memory, the first identification information represented by the mark includes unique information unique to the moving object, and the actual data acquisition unit acquires, as the actual data, the first identification information represented by the mark, the reference data acquisition unit may acquire, as the reference data, at least second identification information that is the identification information stored in the second memory, the second identification information including the unique information. According to this aspect, when the mark is generated using the first identification information and the first identification information represented by the mark includes the unique information, the control device compares the first identification information represented by the mark with the second identification information acquired as the reference data. The control device can thus determine whether an instruction can be sent to the moving object to be controlled.

(3-2) In the above aspect, the identification information may be stored in each of a first memory of a moving object control device mounted on the moving object and a second memory of the control device.

When the mark is generated using the second identification information and not using the first identification information, the second identification information represented by the mark includes the unique information, and the actual data acquisition unit acquires, as the actual data, the second identification information represented by the mark, the reference data acquisition unit may acquire, as the reference data, at least the first identification information including the unique information. According to this aspect, when the mark is generated using the second identification information and not using the first identification information, and the second identification information represented by the mark includes the unique information, the control device compares the second identification information represented by the mark with the first identification information acquired as the reference data. The control device can thus determine whether an instruction can be sent to the moving object to be controlled.

(3-3) In the above aspect, the identification information may be stored in each of a first memory of a moving object control device mounted on the moving object and a second memory of the control device.

When the mark is generated using at least the first identification information, the first identification information represented by the mark does not include the unique information and includes non-unique information other than the unique information, and the actual data acquisition unit acquires, as the actual data, the non-unique information included in the first identification information represented by the mark and the unique information acquired using access information represented by the mark, the reference data acquisition unit may acquire, as the reference data, at least the second identification information including the unique information and the non-unique information, the access information being information for accessing the first memory. According to this aspect, when the mark is generated using at least the first identification information, and the first identification information represented by the mark does not include the unique information and includes the non-unique information, the control device compares the non-unique information included in the first identification information represented by the mark with the non-unique information acquired as the reference data. The control device also compares the unique information acquired using the access information represented by the mark with the unique information acquired as the reference data. The control device can thus determine whether an instruction can be sent to the moving object to be controlled.

(4) A second aspect of the present disclosure provides a control system. The control system includes: a moving object that is movable by remote control; and a control device installed at a place different from the moving object.

The moving object includes a communication device and a moving object control device.

The communication device includes a generation unit configured to generate a mark using at least identification information for identifying the moving object, the identification information being information acquired from either or both of the control device and the moving object control device, and an external monitor configured to display the mark.

The control device includes an actual data acquisition unit configured to acquire actual data on either or both of the mark displayed on the external monitor and acquired information acquired using the mark, the acquired information including the identification information, a reference data acquisition unit configured to acquire reference data corresponding to the actual data, and a remote control unit configured to remotely control the moving object and configured to perform different processes related to movement of the moving object between when the actual data and the reference data match each other and when the actual data and the reference data do not match each other. According to this aspect, the control system can generate the mark using the identification information acquired from either or both of the control device and the moving object control device. The control system compares the actual data acquired using the mark with the reference data. This allows the control system to determine whether an instruction can be sent to the moving object to be controlled, without detecting whether an operation instructed to the moving object to be controlled has been performed. The control system can therefore more appropriately determine whether an instruction can be sent to the moving object to be controlled. The control system can also perform different processes related to movement of the moving object between when the actual data and the reference data match each other and when the actual data and the reference data do not match each other. That is, the control system can perform different processes related to movement of the moving object depending on the determination result as to whether an instruction can be sent to the moving object.

(5) A third aspect of the present disclosure provides a control system. The control system includes: a moving object that is movable by remote control; and a control device installed at a place different from the moving object.

The moving object includes a communication device, the communication device including an external monitor configured to display a mark acquired from the control device.

The control device includes a memory configured to store identification information for identifying the moving object, a generation unit configured to generate the mark using at least the identification information stored in the memory, an actual data acquisition unit configured to acquire actual data on either or both of the mark displayed on the external monitor and acquired information acquired using the mark, the acquired information including the identification information, a reference data acquisition unit configured to acquire reference data corresponding to the actual data, and a remote control unit configured to remotely control the moving object and configured to perform different processes related to movement of the moving object between when the actual data and the reference data match each other and when the actual data and the reference data do not match each other. According to this aspect, the control device can generate the mark using the identification information stored in the memory. The control system compares the actual data acquired using the mark with the reference data. This allows the control system to determine whether an instruction can be sent to the moving object to be controlled, without detecting whether an operation instructed to the moving object to be controlled has been performed. The control system can therefore more appropriately determine whether an instruction can be sent to the moving object to be controlled. The control system can also perform different processes related to movement of the moving object between when the actual data and the reference data match each other and when the actual data and the reference data do not match each other. That is, the control system can perform different processes related to movement of the moving object depending on the determination result as to whether an instruction can be sent to the moving object.

The present disclosure can be implemented in various forms other than the control device and control system described above. For example, the present disclosure can be implemented in the following forms: a moving object that is controlled by the control device, a manufacturing method of at least one of the control device, the control system, and the moving object, a control method for at least one of the control device, the control system, and the moving object, a method for identifying the moving object and the communication device mounted on the moving object, a remote control method for the moving object, a computer program that implements any of the methods, and a non-transitory recording medium storing the computer program.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a block diagram illustrating a configuration of a control system according to a second embodiment;

FIG. 6 is a first flowchart illustrating a determination method according to the second embodiment;

FIG. 9 is a block diagram illustrating a configuration of a control system according to a third embodiment;

FIG. 11 is a block diagram showing a configuration of a control system according to a fourth embodiment.

DETAILED DESCRIPTION OF EMBODIMENTS

A. First Embodiment

Figure 1:
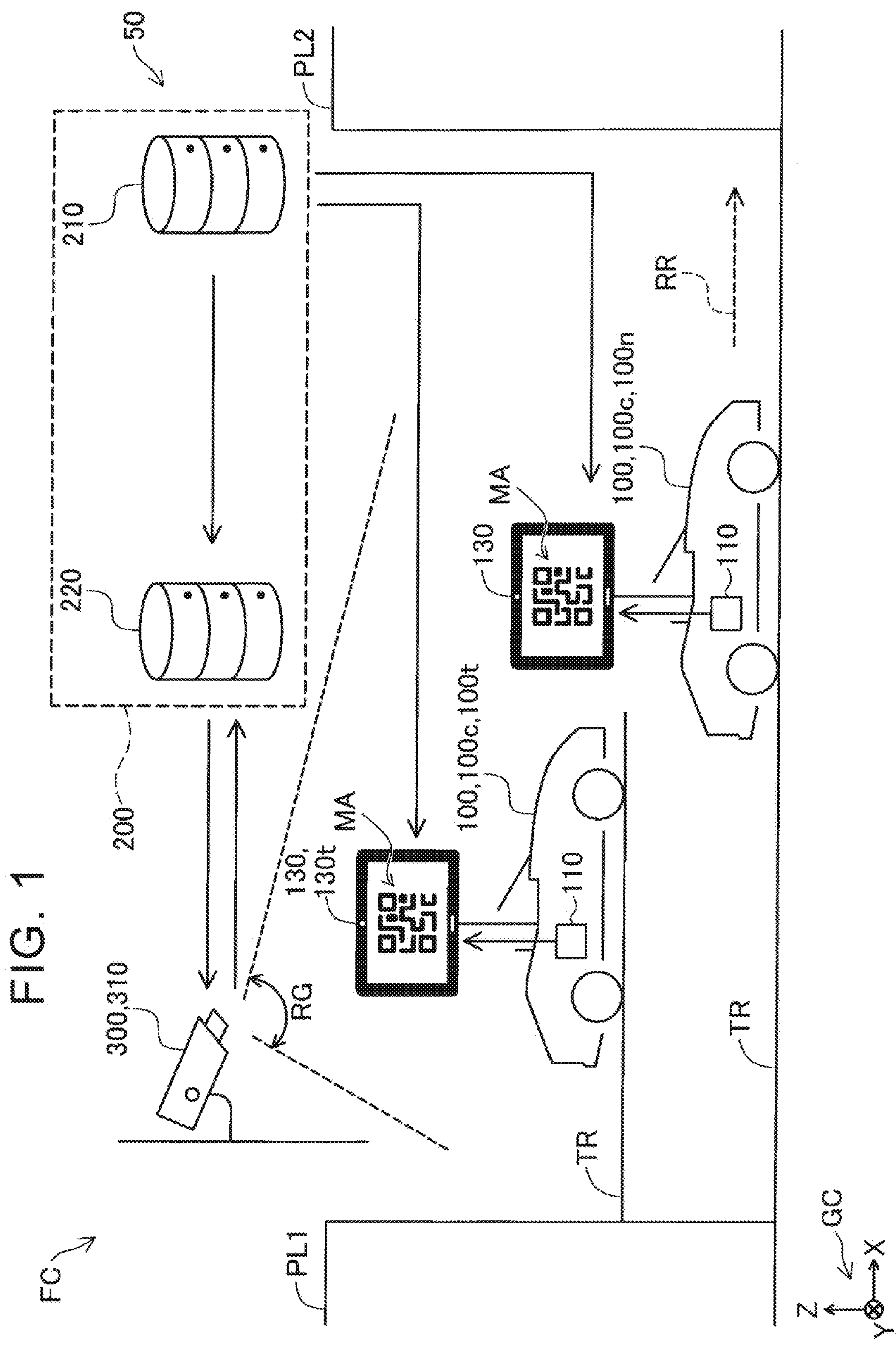
FIG. 1 is a conceptual diagram showing a configuration of a control system.

FIG. 1 is a conceptual diagram illustrating a configuration of a control system 50. The control system 50 includes one or more vehicles 100 as a moving object, a remote control device 200 as a control device, and one or more external sensors 300. The control system 50 is a system for causing the target vehicle 100*t* to travel without causing the non-target vehicle 100*n* to travel by mistake. The target vehicle 100*t* is the vehicle 100 to be remotely controlled. The non-target vehicle 100*n* is another vehicle 100 that differs from the target vehicle 100*t*. Hereinafter, when there is no need to distinguish the respective vehicles 100*n*, 100*t*, the vehicle is simply referred to as "vehicle 100".

In the present disclosure, "moving object" means a movable object, and is, for example, a vehicle or an electric vertical takeoff and landing machine (a so-called flying vehicle). The vehicle may be a vehicle traveling by a wheel or a vehicle traveling by an infinite track, and is, for example, a passenger car, a truck, a bus, a two-wheeled vehicle, a four-wheeled vehicle, a tank, a construction vehicle, or the like. Vehicles include battery electric vehicle (BEV: Battery Electric Vehicle), gasoline-powered vehicles, hybrid electric vehicle, and fuel cell electric vehicle. When the moving object is other than the vehicle, the expressions of "vehicle" and "car" in the present disclosure can be appropriately replaced with "moving object", and the expression of "traveling" can be appropriately replaced with "moving".

The vehicle 100 is configured to be able to travel by unmanned driving. The term "unmanned driving" means driving that does not depend on the traveling operation of the passenger. The traveling operation means an operation related to at least one of "running", "turning", and "stopping" of the vehicle 100. The unmanned driving is realized by automatic or manual remote control using a device located outside the vehicle 100 or by autonomous control of the vehicle 100. A passenger who does not perform the traveling operation may be on the vehicle 100 traveling by the unmanned driving. The passenger who does not perform the traveling operation includes, for example, a person who is simply seated on the seat of the vehicle 100 and a person who performs a work different from the traveling operation such as an assembling operation, an inspection operation, and an operation of switches while riding on the vehicle 100. Driving by the traveling operation of the occupant is sometimes referred to as "manned driving".

Herein, "remote control" includes "full remote control" in which all of the operations of the vehicle 100 are completely determined from the outside of the vehicle 100, and "partial remote control" in which a part of the operations of the vehicle 100 is determined from the outside of the vehicle 100. Further, "autonomous control" includes "fully autonomous control" in which the vehicle 100 autonomously controls its operation without receiving any information from a device external to the vehicle 100, and "partially autonomous control" in which the vehicle 100 autonomously controls its operation using information received from a device external to the vehicle 100.

In the present embodiment, the control system 50 is used in a factory FC that manufactures the vehicles 100. The reference coordinate system of the factory FC is a global coordinate system GC, and any position in the factory FC can be represented by the coordinates of X, Y, Z in the global coordinate system GC. The factory FC includes a first location PL1 and a second location PL2. The first location PL1 and the second location PL2 are connected by a track TR on which the vehicles 100 can travel. In the factory FC, a plurality of external sensors 300 are installed along the track TR. The positions of the external sensors 300 in the factory FC are adjusted in advance. The vehicles 100 travel through the track TR from the first location PL1 to the second location PL2 by unmanned driving.

Figure 2:
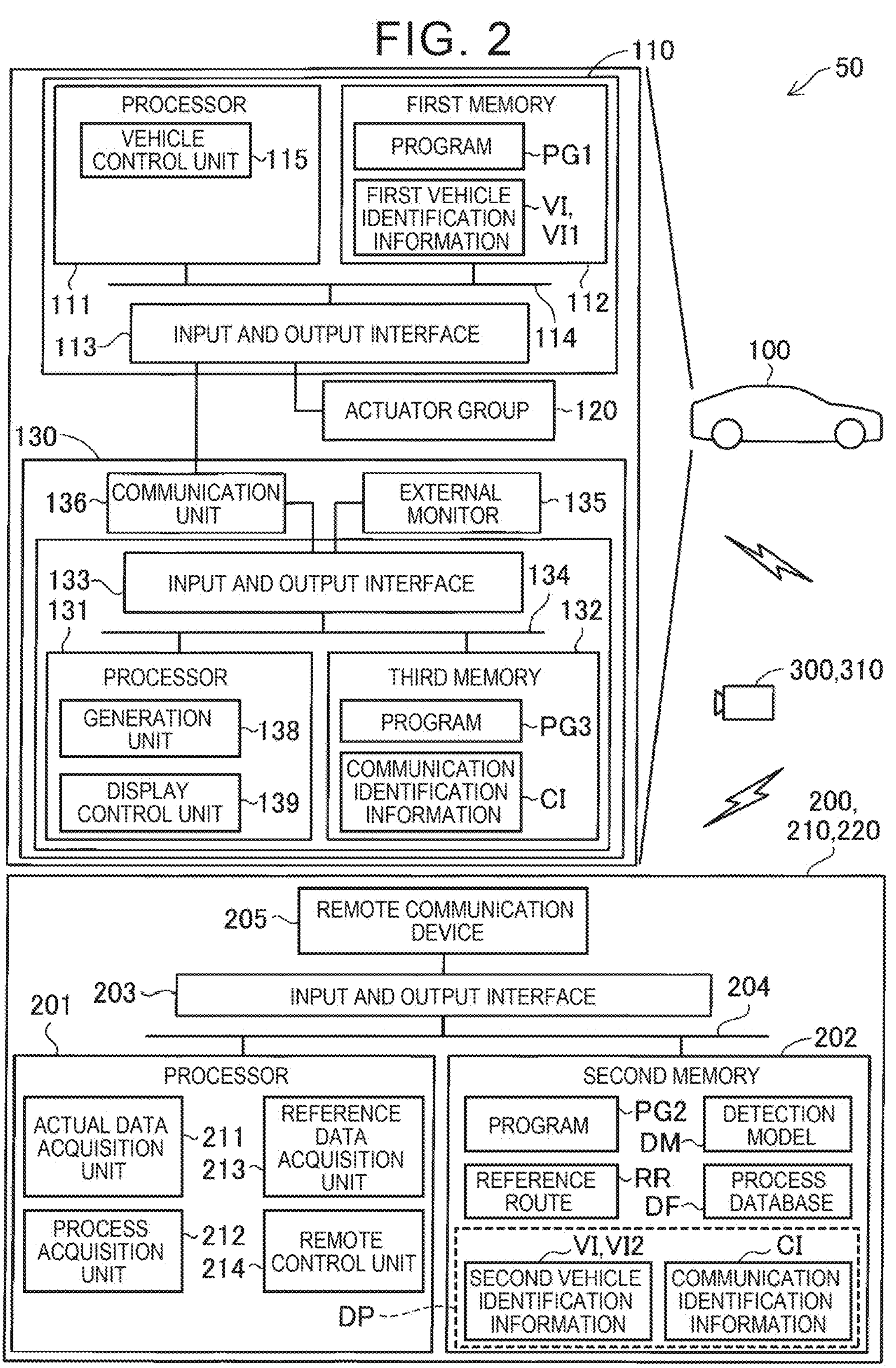
FIG. 2 is a block diagram illustrating a configuration of a control system according to the first embodiment.

FIG. 2 is a block diagram illustrating a configuration of the control system 50 according to the first embodiment. The vehicle 100 includes a vehicle control device 110 for controlling each unit of the vehicle 100, an actuator group 120 including one or more actuators driven under the control of the vehicle control device 110, and a vehicle communication device 130 for wirelessly communicating with an external device such as the remote control device 200. The actuator group 120 includes an actuator of a driving device for accelerating the vehicle 100, an actuator of a steering device for changing a traveling direction of the vehicle 100, and an actuator of a braking device for decelerating the vehicle 100.

The vehicle control device 110 includes a computer including a processor 111, a first memory 112, an input/output interface 113, and an internal bus 114. The processor 111, the first memory 112, and the input/output interface 113 are bidirectionally communicably connected to each other via an internal bus 114. An actuator group 120 and a vehicle communication device 130 are connected to the input/output interface 113. The processor 111 executes the program PG1 stored in the first memory 112 to realize various functions including the functions of the vehicle control unit 115.

The vehicle control unit 115 controls the actuator group 120 to cause the vehicle 100 to travel. The vehicle control unit 115 can cause the vehicle 100 to travel by controlling the actuator group 120 using the travel control signal received from the remote control device 200. The travel control signal is a control signal for causing the vehicle 100 to travel. In the present embodiment, the travel control signal includes the acceleration and the steering angle of the vehicle 100 as parameters. In other embodiments, the travel control signal may include the speed of the vehicle 100 as a parameter in place of or in addition to the acceleration of the vehicle 100.

In the present embodiment, vehicle identification information VI of predetermined items is written in the first memories 112 in the respective manufacturing processes. Thus, the first memories 112 store vehicle identification information VI of predetermined items in accordance with the manufacturing process. In other words, the items of the vehicle identification information VI stored in the first memories 112 are set according to the manufacturing process. The vehicle identification information VI is information for identifying a plurality of vehicles 100. The vehicle-identification information VI is at least one of unique information and non-unique information, and includes information of one or more items. The unique information is information unique to each vehicle 100 that can uniquely identify the vehicle 100. The unique information is, for example, a vehicle identification number allocated to each vehicle 100 so as not to overlap among the plurality of vehicles 100. The vehicle-identification number is, for example, a VIN number. The non-unique information is information related to the vehicle 100 other than the unique information. The non-unique information is, for example, product number information related to a product number of hardware and software mounted on the vehicle 100. The non-unique information may be specification information about the specifications of the vehicle 100, or may be destination information about a destination indicating a region and a country where the vehicle 100 is shipped. In addition, the non-unique information may be an in-factory identification number allocated to each vehicle 100 to identify a plurality of vehicles 100 in one factory FC. The vehicle identification information VI may include, for example, time-series data indicating a transition of a state quantity indicating a state of the mounting device mounted on the vehicle 100. The vehicle identification information VI may include, for example, time-series data indicating a change in the charge rate of the main battery that supplies electric power to the traveling motor. Further, the vehicle identification information VI may include numerical information calculated by executing an arithmetic process using a predetermined function in numerical information representing a vehicle identification number, product number information, specification information, destination information, an in-plant identification number, and the like. Hereinafter, the vehicle identification information VI stored in the first memories 112 is also referred to as "first vehicle identification information VI1".

The vehicle communication device 130 includes a processor 131, a third memory 132, an input/output interface 133, an internal bus 134, and an external monitor 135. The processor 131, the third memory 132, the input/output interface 133, and the external monitor 135 are bi-directionally communicably connected via an internal bus 134. A communication unit 136 for communicating with various devices outside the vehicle communication device 130 is connected to the input/output interface 133. The communication unit 136 can communicate with the remote control device 200 and the external sensor 300 by wireless communication, and can communicate with the vehicle control device 110 by wired communication or wireless communication. The external monitor 135 is, for example, a liquid crystal display. The external monitor 135 is disposed at a position visible from the outside of the vehicle 100. The processor 131 executes the program PG3 stored in the third memory 132 to realize various functions including the functions of the generation unit 138 and the display control unit 139.

The generation unit 138 generates mark MA. In the present embodiment, the generation unit 138 acquires the first vehicle identification information VI1 including the unique information from the vehicle control device 110. Then, the generation unit 138 generates, as the mark MA, a QR code (registered trademark, hereinafter abbreviated) representing the acquired first vehicle identification information VI1 and its own communication identification information CI. The communication identification information CI is information for identifying the plurality of vehicle communication devices 130. The communication identification information CI includes, for example, access information and a terminal-specific ID. The access information is information indicating an access destination for accessing the vehicle communication device 130. The access-information includes, for example, a IP address and a port-number of the vehicle communication device 130. The terminal-specific ID is an identifier allocated to the respective vehicle communication devices 130 so as not to overlap among the plurality of vehicle communication devices 130. The terminal-specific ID is, for example, MAC address of the vehicle communication device 130.

Note that, in the present embodiment, the mark MA is a code representing various types of information, and may be, for example, a one-dimensional code such as a bar code, a stacked two-dimensional code, or a matrix two-dimensional code other than a QR code. In other embodiments, the mark MA may be a character string representing various kinds of information such as a vehicle identification information VI, or may be a character, a figure, a symbol, a three-dimensional shape, a color, or a combination thereof, depending on various kinds of information such as a vehicle identification information VI.

The display control unit 139 causes the external monitor 135 to display the mark MA generated by the generation unit 138. At this time, the display control unit 139 may cause the external monitor 135 to display the mark MA according to a predetermined display pattern. For example, the display control unit 139 may cause the external monitor 135 to display the same mark MA in a different display pattern between the host vehicle 100 and the other vehicle 100.

The external sensor 300 is a sensor located outside the vehicle 100. The external sensor 300 in the present embodiment is a sensor that captures the vehicle 100 from the outside of the vehicle 100. The external sensor 300 includes a communication device (not shown) and can communicate with other devices such as the remote control device 200 by wired communication or wireless communication.

Specifically, the external sensor 300 is constituted by a camera. The camera as the external sensor 300 captures an image of the vehicle 100 and outputs a captured image as a detection result. Hereinafter, a camera as the external sensor 300 is also referred to as an "external camera 310".

As shown in FIG. 1, the remote control device 200 is installed at a different location from the vehicle 100. The remote control device 200 realizes various functions including the function of the production instruction server 210 and the function of the self-propelled server 220. The production-instruction server 210 sends, to the self-propelled server 220, a travel instruction for causing the target vehicle 100*t* to travel by remote control. The self-propelled server 220 causes the target vehicle 100*t* to travel when a travel instruction for causing the target vehicle 100*t* to travel is received from the production-instruction server 210.

Here, the remote control device 200 causes the target vehicle 100*t* to travel by sending an instruction to the target vehicle 100*t* using, for example, access information for accessing the target communication device 130*t*. The target communication device 130*t* is the vehicle communication device 130 registered in advance in the production management database DP stored in the second memory 202 as the vehicle communication device 130 scheduled to be mounted on the target vehicle 100*t*. However, the same IP may be assigned to a plurality of devices in the same network. When the same IP address as IP address of the vehicle communication device 130 mounted on the target vehicle 100*t* is also assigned to another device used in the factory FC, the following possibility may occur. In this case, there may be a possibility that the remote control device 200 sends an instruction to another device having the same IP address as IP address of the vehicle communication device 130 mounted on the target vehicle 100*t*. As a result, the target vehicle 100*t* may not be able to travel. Further, when the same IP address as IP address of the vehicle communication device 130 mounted on the target vehicle 100*t* is also assigned to the vehicle communication device 130 mounted on the non-target vehicle 100*n*, the following possibility may occur. In this case, there may be a possibility that the remote control device 200 sends an instruction to the other vehicle communication device 130 having the same IP address as IP address of the vehicle communication device 130 mounted on the target vehicle 100*t*, and the vehicle communication device 130 mounted on the non-target vehicle 100*n*. This may cause the non-target vehicle 100*n* to erroneously travel. In addition, when the vehicle communication device 130 is replaced due to a failure or the like, the vehicle communication device 130 scheduled to be mounted on the target vehicle 100*t* may be mounted on the non-target vehicle 100*n* after being repaired or the like. In this case, there may be a possibility that the remote control device 200 sends an instruction to the target communication device 130*t* mounted on the non-target vehicle 100*n*. This may cause the non-target vehicle 100*n* to erroneously travel. As described above, it is determined whether or not an instruction can be sent to the target vehicle 100*t* by using only the access-information. Therefore, the remote control device 200 determines whether or not an instruction can be sent to the target vehicle 100*t* using the mark MA. Then, when it is determined that the instruction can be sent to the target vehicle 100*t*, the remote control device 200 remotely controls the operation of the target vehicle 100*t* via the vehicle communication device 130 to cause the target vehicle 100*t* to travel.

As illustrated in FIG. 2, the remote control device 200 includes a computer including a processor 201, a second memory 202, an input/output interface 203, and an internal bus 204. The processor 201, the second memory 202, and the input/output interface 203 are bidirectionally communicably connected to each other via an internal bus 204. The input/output interface 203 is connected with a remote communication device 205 for communicating with various devices external to the remote control device 200. The remote communication device 205 may communicate with the vehicle 100 by wireless communication, and may communicate with each external sensor 300 by wired communication or wireless communication.

The second memory 202 stores various types of information including a production-management-database DP. The production-management database DP is a database in which the vehicle identification information VI of one or more vehicles 100 including the target vehicle 100*t* and the communication identification information CI of the vehicle communication device 130 scheduled to be mounted on the respective vehicles 100 are associated with each other. Hereinafter, the vehicle identification information VI stored in the second memory 202 is also referred to as "second vehicle identification information VI2". When the respective vehicle identification information VI1, IN2 do not need to be distinguished, they are simply referred to as "vehicle identification information VI".

The processor 201 executes the program PG2 stored in the second memory 202 to realize various functions including functions as the actual data acquisition unit 211, the process acquisition unit 212, the reference data acquisition unit 213, and the remote control unit 214.

The actual data acquisition unit 211 acquires actual data of at least one of the mark MA displayed on the external monitor 135 and the acquired information that is acquired using the mark MA and includes the vehicle-identification information VI. In the present embodiment, the actual data acquisition unit 211 acquires captured images from the external cameras 310 capable of capturing images of areas in which the target vehicle 100*t* is scheduled to exist. Then, the actual data acquisition unit 211 searches for the mark MA in the captured images. When a mark MA is found in a captured image, the actual data acquisition unit 211 decodes the found mark MA. As a result, the actual data acquisition unit 211 acquires, as the actual data, acquired information represented by the mark MA. The acquired information includes the first vehicle identification information VI1 including the unique information and the communication identification information CI.

Note that, as illustrated in FIG. 1, when a plurality of vehicles 100 exist in the imaging range RG of the external camera 310 and a plurality of mark MA are found in the captured image, the actual data acquisition unit 211 decrypts all the mark MA, for example. As a result, the actual data acquisition unit 211 acquires the acquired information for all the candidate vehicle 100*c* that may be the target vehicle 100*t*.

The process acquisition unit 212 illustrated in FIG. 2 acquires process data indicating a manufacturing process being performed on the target vehicle 100*t*. The process information is, for example, a process ID indicating a manufacturing process being performed on the target vehicle 100*t*. The process ID is an identifier allocated to the respective manufacturing processes so as not to overlap among the plurality of manufacturing processes. The process information is generated by, for example, detecting a plurality of feature points that can identify a plurality of manufacturing processes from captured images obtained by capturing the target vehicle 100*t*, and specifying a manufacturing process being performed on the target vehicle 100*t*. The process information may be generated by specifying a manufacturing process being performed on the target vehicle 100*t* using the manufacturing control information indicating the manufacturing status of the vehicles 100 in the factory FC.

The reference data acquisition unit 213 acquires reference data corresponding to the actual data. The reference data is data to be acquired in order to match the actual data and to identify the target vehicle 100*t* and the non-target vehicle 100*n*. For example, when the actual data acquisition unit 211 acquires the mark MA as the actual data, the reference data acquisition unit 213 acquires the mark MA to be acquired as the reference data. When the actual data acquisition unit 211 acquires the acquired information represented by the mark MA as the actual data, the reference data acquisition unit 213 acquires the information corresponding to the acquired information as the reference data.

In the present embodiment, the reference data acquisition unit 213 acquires, as reference data, information on items corresponding to the manufacturing process specified by the process information and the communication identification information CI of the target communication device 130*t* in the second vehicle identification information VI2 of the target vehicle 100*t*. Specifically, the reference data acquisition unit 213 acquires items corresponding to the manufacturing process identified by the process information using the process database DF stored in the second memory 202. Thus, the reference data acquisition unit 213 specifies an item corresponding to the manufacturing process specified by the process information. The process database DF is a database in which items of the first vehicle identification information VI1 are associated with each manufacturing process. The reference data acquisition unit 213 acquires the second vehicle identification information VI2 of the items corresponding to the specified manufacturing process. For example, when the manufacturing process performed on the target vehicle 100*t* is the first manufacturing process and the vehicle identification number and the item number information are written in the first memory 112 in the first manufacturing process, the items corresponding to the manufacturing process specified by the process information are the vehicle identification number and the item number information. In this case, when the vehicle identification number, the item number information, the specification information, the destination information, and the factory identification number are stored in the second memory 202 as the vehicle identification information VI, the reference data acquisition unit 213 acquires the vehicle identification number and the item number information without acquiring the specification information, the destination information, and the factory identification number stored in the second memory 202. In addition, the reference data acquisition unit 213 acquires the communication identification information CI associated with the unique information of the target vehicle 100*t* by using the production-management-database DP stored in the second memory 202.

The remote control unit 214 determines whether or not an instruction can be sent to the target vehicle 100*t* by collating the actual data with the reference data. When determining that an instruction can be sent to the target vehicle 100*t*, the remote control unit 214 sends a travel control signal to the target vehicle 100*t* to cause the target vehicle 100*t* to travel by remote control. Thus, the remote control unit 214 causes the target vehicle 100*t* to travel without causing the non-target vehicle 100*n* to travel erroneously.

The remote control unit 214 makes the process related to the traveling of the vehicle 100 different between the case where the actual data and the reference data match and the case where the actual data and the reference data do not match. The remote control unit 214 compares the actual data with the reference data. When the actual data and the reference data coincide with each other, the remote control unit 214 can send an instruction to the target vehicle 100*t*, and thus determines that the target vehicle 100*t* is allowed to travel. When it is determined that an instruction can be sent to the target vehicle 100*t*, the remote control unit 214 acquires a detection result by the sensor, generates a travel control signal for controlling the actuator group 120 of the target vehicle 100*t* using the detection result, and sends the travel control signal to the target vehicle 100*t*. Thus, the remote control unit 214 causes the target vehicle 100*t* to travel without causing the non-target vehicle 100*n* to travel. On the other hand, when the actual data and the reference data do not coincide with each other, the remote control unit 214 cannot send an instruction to the target vehicle 100*t*, and thus determines that the target vehicle 100*t* must not be caused to travel. When it is determined that the instruction cannot be sent to the target vehicle 100*t*, the remote control unit 214 ends the process without sending the travel control signal to the target vehicle 100*t*.

In the present embodiment, the remote control unit 214 compares the first vehicle identification information VI1 represented by the mark MA with the second vehicle identification information VI2 of the target vehicle 100*t*, thereby identifying the target vehicle 100*t* and the non-target vehicle 100*n* and confirming whether or not it is the target vehicle 100*t*. The remote control unit 214 verifies the communication identification information CI represented by the mark MA and the communication identification information CI of the target communication device 130*t* to confirm whether or not the target communication device 130*t* is mounted on the target vehicle 100*t* as scheduled as indicated in the production-management-database DP. When the first vehicle identification information VI1 represented by the mark MA matches the second vehicle identification information VI2 of the target vehicle 100*t*, and the communication identification information CI represented by the mark MA matches the communication identification information CI of the target communication device 130*t*, the remote control unit 214 determines as follows. In this case, the remote control unit 214 can send an instruction to the target vehicle 100*t*, and thus determines that the target vehicle 100_t_ is allowed to travel. On the other hand when at least one of the following cases is applicable; a case where the first vehicle identification information VI1 represented by the mark MA does not coincide with the second vehicle identification information VI2 of the target vehicle 100_t_, and a case where the communication identification information CI represented by the mark MA does not coincide with the communication identification information CI of the target communication device 130_t_, the remote control unit 214 determines as follows. In this case, the remote control unit 214 determines that the target vehicle 100_t_ must not be caused to travel because the instruction cannot be sent to the target vehicle 100_t_.

As illustrated in FIG. 1, when the actual data acquisition unit 211 acquires the vehicle identification information VI of the plurality of candidate vehicle 100_c_, the remote control unit 214 collates the actual data with the reference data for each candidate vehicle 100_c_, for example. Then, when the actual data of the candidate vehicle 100_c_ and the reference data coincide with each other, the remote control unit 214 determines that the candidate vehicle 100_c_ is the target vehicle 100_t_ and the target vehicle 100_t_ is allowed to travel. On the other hand, when the actual data of the candidate vehicle 100_c_ and the reference data do not coincide with each other, the remote control unit 214 determines that the candidate vehicle 100_c_ is the non-target vehicle 100_n_ and that the target vehicle 100_t_ should not be caused to travel.

When the actual data acquisition unit 211 acquires the mark MA as the actual data, the reference data acquisition unit 213 acquires the mark MA as the reference data corresponding to the actual data. The remote control unit 214 compares the mark MA displayed on the external monitor 135 with the mark MA acquired as the reference data. Then, when the mark MA displayed on the external monitor 135 matches the mark MA acquired as the reference data, the remote control unit 214 can send an instruction to the target vehicle 100_t_, and thus determines that the target vehicle 100_t_ is allowed to travel. On the other hand, when the mark MA displayed on the external monitor 135 and the mark MA acquired as the reference data do not coincide with each other, the remote control unit 214 cannot send an instruction to the target vehicle 100_t_, and thus determines that the target vehicle 100_t_ must not be driven.

Figure 3:
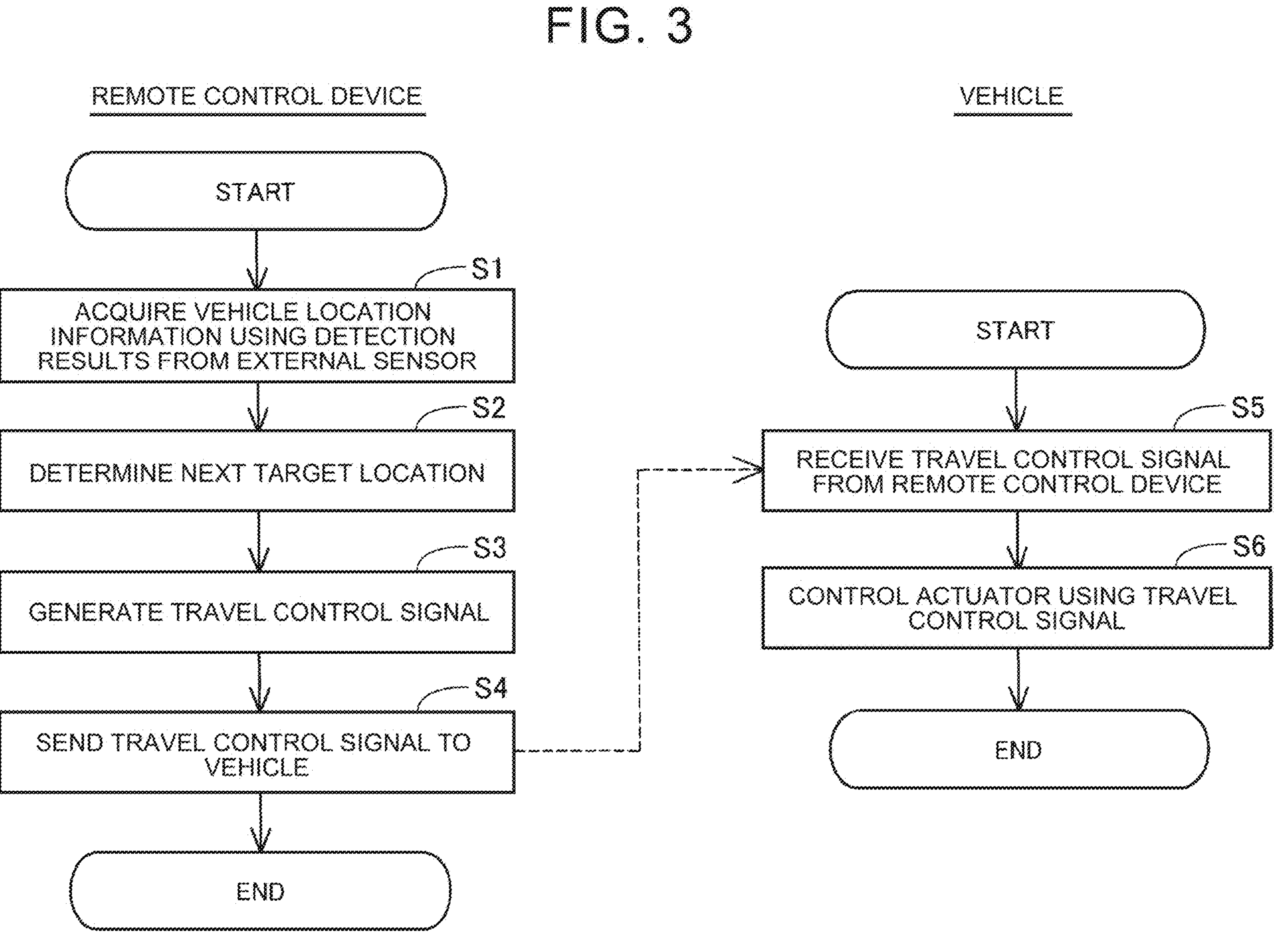
FIG. 3 is a flowchart showing a processing procedure when a vehicle is driven by remote control.

FIG. 3 is a flowchart illustrating a processing procedure of travel control when the vehicle 100 is caused to travel by remote control. In the flowchart illustrated in FIG. 3, for example, the target vehicle 100_t_ is repeatedly performed at a predetermined cycle during a time period in which the vehicle travels by remote control.

In S1, the remote control unit 214 of the remote control device 200 acquires the vehicle position information using the detection result outputted from the external sensor 300. The vehicle position information is position information that is a basis for generating a travel control signal. In the present embodiment, the vehicle position information includes the position and orientation of the vehicle 100 in the global coordinate system GC of the factory FC. Specifically, in S1, the remote control unit 214 acquires the vehicle position data using the captured images acquired from the cameras that are the external sensors 300.

Specifically, in S1, the remote control unit 214 acquires the position of the vehicle 100 by, for example, detecting the outer shape of the vehicle 100 from the captured image, calculating the coordinate system of the captured image, that is, the coordinates of the positioning point of the vehicle 100 in the local coordinate system, and converting the calculated coordinates into the coordinates in the global coordinate system GC. The outline of the vehicle 100 included in the captured image can be detected by, for example, inputting the captured image into a detection-model DM using artificial intelligence. The detection-model DM is prepared in the control system 50 or outside the control system 50 and stored in advance in the second memory 202, for example. Examples of the detection-model DM include a learned machine learning model that is learned so as to realize one of semantic segmentation and instance segmentation. As the machine learning model, for example, a convolutional neural network (hereinafter referred to as a CNN) learned by supervised learning using a learning dataset can be used. The training data set includes, for example, a plurality of training images including the vehicle 100 and a label indicating which of the regions in the training image indicates the vehicle 100 and the regions other than the vehicle 100. When CNN is learned, the parameters of CNN are preferably updated by back propagation so as to reduce the error between the output-result and-label due to the detection-model DM. Further, the remote control unit 214 can acquire the orientation of the vehicle 100 by estimating the orientation of the movement vector of the vehicle 100 calculated from the positional change of the feature point of the vehicle 100 between the frames of the captured image using, for example, the optical flow method.

In S2, the remote control unit 214 determines a target position to which the vehicles 100 are to be directed next. In the present embodiment, the target position is represented by the coordinates of X, Y, Z in the global coordinate system GC. The second memories 202 store in advance reference-route RR that is a route on which the vehicles 100 should travel. The route is represented by a node indicating a starting point, a node indicating a passing point, a node indicating a destination, and a link connecting the respective nodes. The remote control unit 214 uses the vehicle position information and the reference-route RR to determine a target position to which the vehicle 100 is to be directed next. The remote control unit 214 determines the target position on the reference-route RR ahead of the current position of the vehicles 100.

At S3, the remote control unit 214 generates a travel control signal for causing the vehicle 100 to travel toward the determined target position. The remote control unit 214 calculates the traveling speed of the vehicle 100 from the transition of the position of the vehicle 100, and compares the calculated traveling speed with the target speed. As a whole, the remote control unit 214 determines the acceleration so that the vehicle 100 accelerates when the traveling speed is lower than the target speed, and determines the acceleration so that the vehicle 100 decelerates when the traveling speed is higher than the target speed. Further, the remote control unit 214 determines the steering angle and the acceleration so that the vehicle 100 does not deviate from the reference-route RR when the vehicle 100 is located on the reference-route RR, and determines the steering angle and the acceleration so that the vehicle 100 returns to the reference-route RR when the vehicle 100 is not located on the reference-route RR, in other words, when the vehicle 100 deviates from the reference-route RR.

At S4, the remote control unit 214 sends the generated travel control signal to the vehicles 100. The processor 201 repeats acquisition of vehicle position information, determination of a target position, generation of a travel control signal, transmission of a travel control signal, and the like at predetermined intervals.

In S5, the vehicle control unit 115 of the vehicle control device 110 mounted on the vehicle 100 receives the travel control signal sent from the remote control device 200. In S6, the vehicle control unit 115 of the vehicle 100 controls the actuator group 120 using the received travel control signal, thereby causing the vehicle 100 to travel at the acceleration and the steering angle represented by the travel control signal. The processor 111 repeatedly receives the travel control signal and controls the actuator group 120 at a predetermined cycle. According to the control system 50 of the present embodiment, the vehicle 100 can be driven by remote control, and the vehicle 100 can be moved without using a conveyance facility such as a crane or a conveyor.

Figure 4:
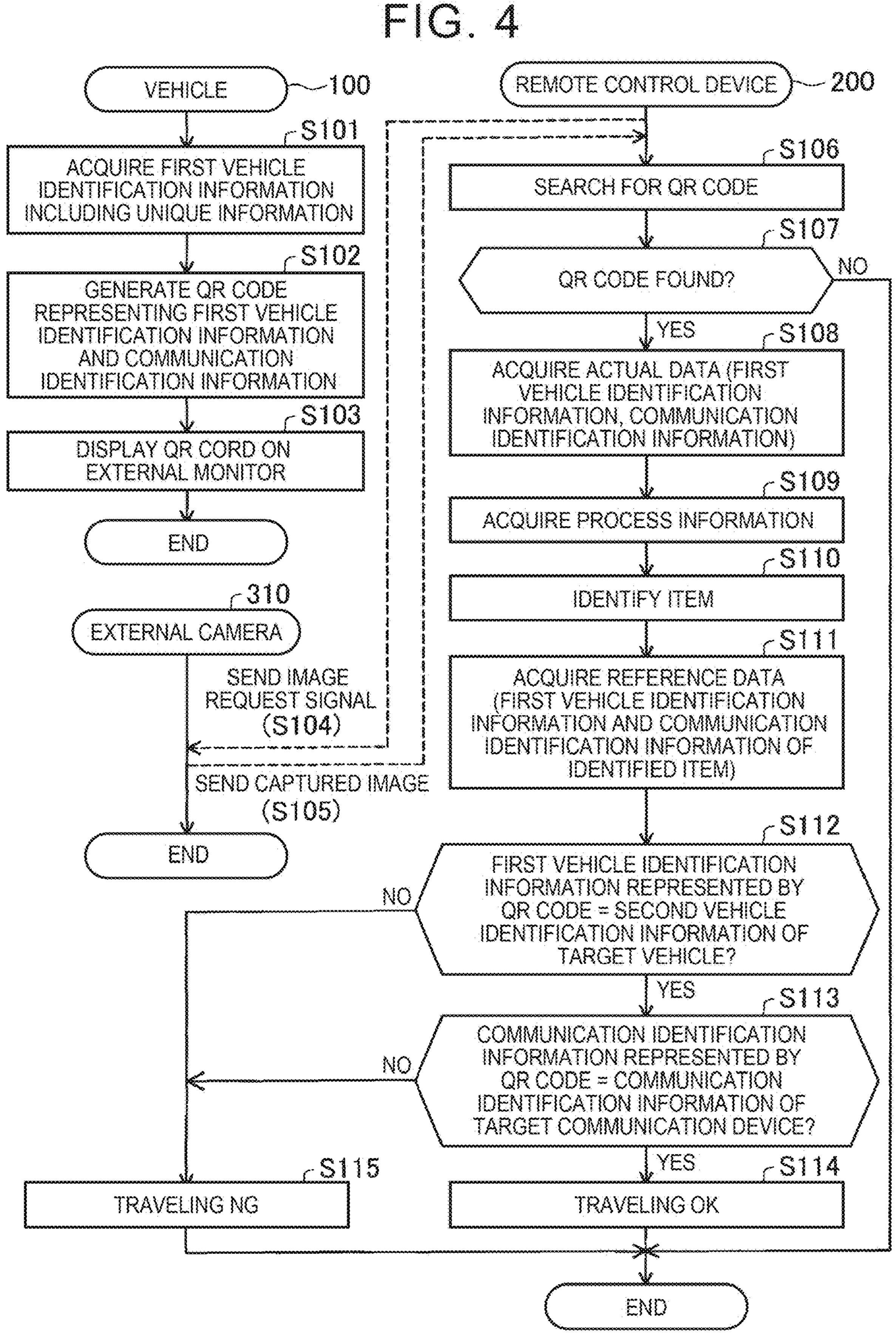
FIG. 4 is a flowchart illustrating a determination method according to the first embodiment.

FIG. 4 is a flow chart illustrating a determination method according to the first embodiment, which determines whether an instruction can be sent to a target vehicle 100*t*. When the vehicle 100 is caused to travel by remote control, it is required to confirm that an instruction can be sent to the target vehicle 100*t* prior to starting the travel. Therefore, the process illustrated in FIG. 4 is performed, for example, prior to starting the travel of the target vehicle 100*t*. In this way, the target vehicle 100*t* can be caused to travel without causing the non-target vehicle 100*n* to travel erroneously. Note that the flowchart illustrated in FIG. 4 may be performed at a predetermined cycle while the target vehicle 100*t* is traveling. In this way, it is possible to confirm that the remote control is being performed on the target vehicle 100*t* at a predetermined cycle while the target vehicle 100*t* is traveling.

In S101, the generation unit 138 of the vehicle communication device 130 acquires the first vehicle identification information VI1 including the unique information from the vehicle control device 110. In S102, the generation unit 138 generates a QR code representing the acquired first vehicle identification information VI1 and its own communication identification information CI. In S103, the display control unit 139 causes the external monitor 135 to display a QR code representing the first vehicle identification information VI1 and the communication identification information CI. The steps from S101 to S103 are performed for each of the vehicles 100.

In S104, the actual data acquisition unit 211 of the remote control device 200 sends an image requesting signal for acquiring a captured image to the external camera 310 capable of capturing an image of an area in which the target vehicle 100*t* is scheduled to exist. Upon receiving the image request signal, the external camera 310 sends the captured image to the remote control device 200 in S105. In S106, the actual data acquisition unit 211 of the remote control device 200 searches for a QR code in the captured image. When a QR code is found in the captured images (S107: Yes), the actual data acquisition unit 211 decodes the found QR code according to a predetermined code standard in S108. As a result, the actual data acquisition unit 211 acquires, as the actual data, the acquired information represented by QR code. The acquired information includes the first vehicle identification information VI1 including the unique information, and the communication identification information CI. On the other hand, when QR code cannot be found in the captured image (S107: No), the control system 50 terminates this process. The case where QR code cannot be found in the captured image is, for example, a case where QR code does not exist in the captured image because the vehicles 100 do not exist in the imaging area of the external camera 310 that generated the captured image. The case where QR code cannot be found in the captured image may be a case where QR code in the captured image cannot be recognized because the image quality of the captured image is poor, or a case where QR code is not present in the captured image because QR code is not displayed on the external monitor 135.

In S109, the process acquisition unit 212 acquires process data. In S110, the reference data acquisition unit 213 uses the process-database DF to acquire items corresponding to the manufacturing process specified by the process information, thereby specifying items corresponding to the manufacturing process specified by the process information. In S111, the reference data acquisition unit 213 acquires, as reference data, information on items corresponding to the manufacturing process specified by the process information and the communication identification information CI of the target communication device 130*t* in the second vehicle identification information VI2 of the target vehicle 100*t*.

In S112, the remote control unit 214 compares the first vehicle identification information VI1 represented by QR code with the second vehicle identification information VI2 of the target vehicle 100*t*. In S113, the remote control unit 214 compares the communication identification information CI represented by QR code with the communication identification information CI of the target communication device 130*t*. The remote control unit 214 determines as shown in S114 when the first vehicle identification information VI1 represented by QR code matches the second vehicle identification information VI2 of the target vehicle 100*t* (S112: Yes), and when the communication identification information CI represented by QR code matches the communication identification information CI of the target communication device 130*t* (S113: Yes). In S114, the remote control unit 214 can send an instruction to the target vehicle 100*t*, and thus determines that the target vehicle 100*t* is allowed to travel. The remote control unit 214 determines as shown in S115 when it corresponds to at least one of a case where the first vehicle identification information VI1 represented by QR code does not match the second vehicle identification information VI2 of the target vehicle 100*t* (S112: No) and a case (S113: No) where the communication identification information CI represented by QR code does not match the communication identification information CI of the target communication device 130*t*. In S115, the remote control unit 214 determines that the target vehicle 100*t* must not be caused to travel because the instruction cannot be sent to the target vehicle 100*t*.

According to the above-described first embodiment, the remote control device 200 can acquire, as the actual data, the acquired information represented by the mark MA. The acquired information includes the first vehicle identification information VI1 including the unique information, and the communication identification information CI. The remote control device 200 can acquire the second vehicle identification information VI2 of the target vehicle 100*t* and the communication identification information CI of the target communication device 130*t* as the reference data corresponding to the actual data. The remote control device 200 can check whether or not the target vehicle 100*t* is the target vehicle 100*t* by collating the first vehicle identification information VI1 as the actual data with the second vehicle identification information VI2 as the reference data, by identifying the target vehicle 100*n* and the non-target vehicle. The remote control device 200 can check whether or not the target communication device 130*t* is mounted on the target vehicle 100*t* as scheduled by collating the communication identification information CI as the actual data with the communication identification information CI as the reference data. Thus, in a case where the first vehicle identification information VI1 represented by the mark MA matches the second vehicle identification information VI2 of the target vehicle 100*t*, and in a case where the communication identification information CI represented by the mark MA matches the communication identification information CI of the target communication device 130*t*, the remote control device 200 can determine that the instruction can be sent to the target vehicle 100*t*. When it corresponds to at least one of a case where the first vehicle identification information VI1 represented by the mark MA does not match the second vehicle identification information VI2 of the target vehicle 100*t* and a case where the communication identification information CI represented by the mark MA does not match the communication identification information CI of the target communication device 130*t*, the remote control device 200 can determine that the instruction cannot be sent to the target vehicle 100*t*. With such a configuration, the remote control device 200 can determine whether or not an instruction can be sent to the target vehicle 100*t* without detecting whether or not the operation instructed to the target vehicle 100*t* has been performed by the external sensor 300. In this way, since the target vehicle 100*t* is the vehicle 100 being manufactured, even when various devices such as lights are not mounted on the target vehicle 100*t* or various devices cannot be used, the remote control device 200 can determine whether or not an instruction can be sent to the target vehicle 100*t*. Further, in such a configuration, the remote control device 200 can determine whether or not an instruction can be sent to the target vehicle 100*t* by checking whether or not the target vehicle is a target vehicle 100*t* and whether or not the target communication device 130*t* is mounted as scheduled on the target vehicle 100*t*. With this configuration, it is possible to solve a problem that may occur when it is determined whether or not an instruction can be sent to the target vehicle 100*t* by using only the access-information. Therefore, the remote control device 200 can more appropriately determine whether or not an instruction can be sent to the target vehicle 100*t*.

Further, according to the first embodiment, the mark MA is generated using the first vehicle identification information VI1. Therefore, on the external monitor 135 of the vehicle communication device 130 mounted on the non-target vehicle 100*n*, the mark MA representing the first vehicle identification information VI1 of the non-target vehicle 100*n* is displayed. Therefore, the remote control device 200 can identify the target vehicle 100*t* and the non-target vehicle 100*n* by collating the first vehicle identification information VI1 represented by the mark MA in the captured image with the second vehicle identification information VI2 of the target vehicle 100*t*. Thus, the remote control device 200 can acquire the position and the direction of the target vehicle 100*t* by performing image analysis on the target vehicle 100*t* in the captured image.

Further, according to the first embodiment, the remote control device 200 searches for the mark MA in the captured image in order to acquire the actual data. At this time, if the target communication device 130*t* is not assigned to IP addressing that was scheduled to be assigned to the target communication device 130*t* and is assigned to another device other than the vehicles 100 used in the factory FC for some reason, there is no mark MA in the captured images. Therefore, when the mark MA cannot be found in the captured images, the remote control device 200 can recognize that there is a possibility that IP addressed to be assigned to the target communication device 130*t* is assigned to another device. When the remote control device 200 recognizes that there is a possibility that IP address that is scheduled to be assigned to the target communication device 130*t* is assigned to another device, it may notify the user, for example, by displaying the warning information on the external monitor 135. In this way, it is possible to notify the user that the instruction cannot be sent to the target vehicle 100*t*. Accordingly, it is possible to reduce a possibility that the target vehicle 100*t* cannot be caused to travel.

Further, according to the first embodiment, the remote control device 200 compares the communication identification information CI represented by the mark MA with the communication identification information CI of the target communication device 130*t*. Thus, the remote control device 200 can confirm that the target communication device 130*t* is mounted on the target vehicle 100*t* as scheduled. In this way, when the vehicle communication device 130 is replaced due to a failure or the like, the possibility that the remote control device 200 erroneously drives the non-target vehicle 100*n* can be reduced. In addition, when another mark MA that differs from the mark MA to be displayed on the external monitor 135 is displayed on the external monitor 135 for some reason, the remote control device 200 can reduce the possibility of erroneously driving the non-target vehicle 100*n*. In addition, when the medium on which the other mark MA is printed is arranged to cover the external monitor 135, the remote control device 200 can reduce the possibility of erroneously driving the non-target vehicle 100*n*.

Further, according to the first embodiment, the items of the first vehicle identification information VI1 are set according to the manufacturing process. The remote control device 200 can acquire process data indicating a manufacturing process being performed on the target vehicle 100*t*. When the first vehicle identification information VI1 is acquired as the actual data, the remote control device 200 can acquire at least the information on the items corresponding to the manufacturing process specified by the process information in the second vehicle identification information VI2 as the reference data. In this way, the remote control device 200 can acquire, as the reference data, the information of the item necessary for collating the actual data with the reference data without acquiring, as the reference data, the information of the item unnecessary for collating the actual data with the reference data.

Further, according to the above-described first embodiment, the remote control device 200 can acquire the acquired information including the first vehicle identification information VI1 including the unique information as the actual data. The remote control device 200 can acquire at least the second vehicle-identification information VI2 including the unique information as the reference data. In this way, the remote control device 200 can more accurately determine whether or not an instruction can be sent to the target vehicle 100*t* by using the unique information when collating the actual data with the reference data.

Further, according to the first embodiment, the vehicle communication device 130 can generate the mark MA representing the first vehicle identification information VI1 using the first vehicle identification information VI1 acquired from the vehicle control device 110. In this way, the production instruction server 210 as the remote control device 200 does not write the second vehicle identification information VI2 in the third memory 132 in advance, and the vehicle communication device 130 can generate the mark MA representing the vehicle identification information VI.

Further, according to the first embodiment, when the mark MA is generated using at least the first vehicle identification information VI1 and the first vehicle identification information VI1 includes the unique information, the remote control device 200 can be configured as follows. In this case, the remote control device 200 can determine whether or not an instruction can be sent to the target vehicle 100*t* without acquiring the first vehicle identification information VI1 as the reference data or collating the first vehicle identification information VI1 with the actual data.

Further, according to the first embodiment, when it is determined that the instruction can be sent to the target vehicle 100*t*, the remote control device 200 can cause the target vehicle 100*t* to travel by remote control by sending the travel control signal to the target vehicle 100*t*. On the other hand, when it is determined that the instruction cannot be sent to the target vehicle 100*t*, the remote control device 200 ends the process without sending the travel control signal to the target vehicle 100*t*, so that the non-target vehicle 100*n* can be stopped, for example, without traveling. That is, the remote control device 200 can make the process related to the traveling of the vehicle 100 different between the case where the actual data and the reference data match and the case where the actual data and the reference data do not match.

In the above-described first embodiment, when determining that the instruction can be sent to the target vehicle 100*t*, the remote control device 200 may send the travel control signal in which the vehicle identification information VI is associated as the supplementary information to the vehicle 100. Then, the vehicle control device 110 that has received the travel control signal may determine whether to perform the control of the actuator group 120 using the travel control signal using the supplementary information. In this case, for example, when the supplementary information and the first vehicle identification information VI1 coincide with each other, the vehicle control device 110 performs control of the actuator group 120 using the travel control signal. When the supplementary information and the first vehicle identification information VI1 do not coincide with each other, the vehicle control device 110 ends the process without executing the control of the actuator group 120 using the travel control signal. In this way, the remote control device 200 can cause the target vehicle 100*t* to travel without causing the non-target vehicle 100*n* to travel even when the same IP address is assigned to a plurality of devices in the same network. In addition, the remote control device 200 can reduce the possibility that the target vehicle 100*t* cannot be driven.

B. Second Embodiment

FIG. 5 is a block diagram illustrating a configuration of a control system 50*a* according to the second embodiment. The control system 50*a* includes one or more vehicle 100*a*, a remote control device 200*a* as a control device, and one or more external cameras 310. The present embodiment differs from the first embodiment in a method of generating a mark MA and a determination method of determining whether an instruction can be sent to a target vehicle 100*t*. Other configurations of the control system 50*a* are the same as those of the first embodiment unless otherwise described. The same components as those in the first embodiment are denoted by the same reference numerals, and the description thereof is omitted.

The remote control device 200*a* realizes various functions including a function of the production-instruction server 210*a* and a function of the self-propelled server 220*a*. The production-instruction server 210*a* sends a travel control signal to the target vehicle 100*t* as a travel instruction for causing the target vehicle 100*t* to travel by remote control to the self-propelled server 220*a*. Further, the production instruction server 210*a* writes the second vehicle identification information VI2 of the one or more vehicles 100*a* including the target vehicle 100*t* into the third memory 132*a*. The self-propelled server 220*a* determines whether or not an instruction can be sent to the target vehicle 100*t* when a travel instruction for causing the target vehicle 100*t* to travel is received from the production-instruction server 210*a*. When determining that the instruction can be sent to the target vehicle 100*t*, the self-propelled server 220*a* remotely controls the operation of the target vehicle 100*t* via the vehicle communication device 130 to cause the target vehicle 100*t* to travel.

The remote control device 200*a* includes a computer including a processor 201*a*, a second memory 202*a*, an input/output interface 203, and an internal bus 204. The processor 201*a* executes the program PG2*a* stored in the second memory 202*a* to realize various functions including the functions of the writing unit 215, the device-side switching unit 216, the actual data acquisition unit 211*a*, the reference data acquisition unit 213*a*, and the remote control unit 214*a*.

The writing unit 215 writes the second vehicle identification information VI2 of one or more vehicle 100*a* including the target vehicle 100*t*, the second vehicle identification information VI2 including the unique information, into the third memory 132*a*. For example, as in the first embodiment, when the vehicle communication device 130 mounted on the target vehicle 100*t* is predetermined among the plurality of vehicle communication devices 130 at the time of writing the second vehicle identification information VI2 to the third memory 132*a*, the writing unit 215 performs the following process. In this case, the writing unit 215 writes the second vehicle identification information VI2 of the non-target vehicle 100*n* into the third memory 132*a* without writing the second vehicle identification information VI2 of the target vehicle 100*t* into the third memory 132*a*. On the other hand, when the vehicle communication device 130 mounted on the target vehicle 100*t* among the plurality of vehicle communication devices 130 is not determined in advance at the time of writing the second vehicle identification information VI2 to the third memory 132*a*, the writing unit 215 performs the following process. In this case, the writing unit 215 writes the second vehicle identification information VI2 of the plurality of vehicle 100*a* including the target vehicle 100*t* into the third memory 132*a*. At this time, the writing unit 215 may write the second vehicle identification information VI2 to the third memory 132*a* in the vehicle 100*a* scheduled to be produced within a time period from the time point of writing the second vehicle identification information VI2 to the third memory 132*a* to a predetermined time point.

When the writing unit 215 writes the second vehicle identification information VI2 of the plurality of vehicle 100*a* in the third memory 132*a*, and the mark MA does not represent the vehicle identification information VI but represents the access information, the device-side switching unit 216 performs the following process. The device-side switching unit 216 sends, to the target communication device 130*t*, the second vehicle identification information VI2 that is the second vehicle identification information VI2 of the target vehicle 100*t* and includes the unique information, using the access information represented by the mark MA as a switching instruction for switching the setting of the vehicle communication device 130*a*. Thus, the device-side switching unit 216 causes the vehicle communication device 130*a* to switch the setting of the vehicle communication device 130*a* by causing the vehicle communication device 130*a* to recognize that the vehicle is used for remote control of the target vehicle 100*t*.

The actual data acquisition unit 211*a* acquires acquired information represented by the mark MA as actual data. The actual data acquisition unit 211*a* may further acquire access information represented by the mark MA.

When the actual data acquisition unit 211*a* acquires the first vehicle identification information VI1 including the unique information, the first vehicle identification information VI1 being represented by the mark MA, and the communication identification information CI represented by the mark MA, the reference data acquisition unit 213*a* performs the following process. In this case, the reference data acquisition unit 213*a* acquires, as reference data, the second vehicle identification information VI2 that is the second vehicle identification information VI2 of the target vehicle 100*t* and includes the unique information, and the communication identification information CI of the target communication device 130*t*.

When the actual data acquisition unit 211*a* acquires the second vehicle identification information VI2, which is the second vehicle identification information VI2 represented by the mark MA and includes the unique information, the reference data acquisition unit 213*a* performs the following process. The reference data acquisition unit 213*a* acquires the first vehicle identification information VI1 including the unique information as reference data. At this time, the reference data acquisition unit 213*a* acquires the access information associated with the unique information of the target vehicle 100*t* using, for example, the production-management-database DP stored in the second memory 202*a*. Then, the reference data acquisition unit 213*a* acquires the first vehicle-identification information VI1 using the acquired access-information.

When the actual data acquisition unit 211 acquires the acquired information that is the first vehicle identification information VI1 represented by the mark MA and includes the first vehicle identification information VI1 including the unique information and the communication identification information CI, the remote control unit 214*a* performs the following process. In this case, the remote control unit 214*a* compares the first vehicle identification information VI1 represented by the mark MA with the second vehicle identification information VI2 of the target vehicle 100*t*, thereby identifying the target vehicle 100*t* and the non-target vehicle 100*n* and confirming whether or not it is the target vehicle 100*t*. The remote control unit 214*a* checks whether or not the target communication device 130*t* is mounted on the target vehicle 100*t* as scheduled by collating the communication identification information CI represented by the mark MA with the communication identification information CI of the target communication device 130*t*. When the first vehicle identification information VI1 represented by the mark MA matches the second vehicle identification information VI2 of the target vehicle 100*t*, and the communication identification information CI represented by the mark MA matches the communication identification information CI of the target communication device 130*t*, the remote control unit 214*a* determines as follows. In this case, the remote control unit 214*a* can send an instruction to the target vehicle 100*t*, and thus determines that the target vehicle 100*t* is allowed to travel. On the other hand, in a case where the first vehicle identification information VI1 represented by the mark MA does not match the second vehicle identification information VI2 of the target vehicle 100*t*, and a case where the communication identification information CI represented by the mark MA and the communication identification information CI of the target communication device 130*t* do not match, the remote control unit 214*a* determines as follows. In this case, the remote control unit 214*a* determines that the target vehicle 100*t* must not be caused to travel because the instruction cannot be sent to the target vehicle 100*t*.

When the actual data acquisition unit 211 acquires the second vehicle identification information VI2 that is the second vehicle identification information VI2 represented by the mark MA and includes the unique information, the remote control unit 214*a* performs the following process. Here, the remote control unit 214*a* compares the second vehicle identification information VI2 represented by the mark MA with the first vehicle identification information VI1 acquired as the reference data. Thus, the remote control unit 214*a* identifies the target vehicle 100*t* and the non-target vehicle 100*n*, confirms whether or not the target vehicle is a target vehicle 100*t*, and confirms whether or not the target communication device 130*t* is mounted on the target vehicle 100*t* as scheduled. When the second vehicle identification information VI2 represented by the mark MA and the first vehicle identification information VI1 acquired as the reference data coincide with each other, the remote control unit 214*a* can send an instruction to the target vehicle 100*t*, and thus determines that the target vehicle 100*t* is allowed to travel. On the other hand, when the second vehicle identification information VI2 represented by the mark MA and the first vehicle identification information VI1 acquired as the reference data do not coincide with each other, the remote control unit 214*a* cannot send an instruction to the target vehicle 100*t*, and thus determines that the target vehicle 100*t* must not be caused to travel.

The vehicle 100*a* includes a vehicle control device 110*a* for controlling each part of the vehicle 100*a*, an actuator group 120 including one or more actuators driven under the control of the vehicle control device 110*a*, and a vehicle communication device 130*a* for wirelessly communicating with an external device such as a remote control device 200*a*.

The vehicle-control device 110*a* includes a computer including a processor 111*a*, a first memory 112*a*, an input/output interface 113, and an internal bus 114. The processor 111*a* implements various functions including the functions of the vehicle control unit 115 and the vehicle-side switching unit 116 by executing the program PG1*a* stored in the first memory 112*a*.

When the second vehicle identification information VI2 of the plurality of vehicle 100*a* is written in the third memory 132*a*, the vehicle-side switching unit 116 acquires the first vehicle identification information VI1. When the acquired first vehicle identification information VI1 includes the unique information, the vehicle-side switching unit 116 performs the following process. In this case, the vehicle-side switching unit 116 recognizes that the vehicle is used for remote control of the host vehicle 100*a* among the plurality of vehicle 100*a* specified by the second vehicle identification information VI2 stored in the third memory 132*a*. Accordingly, the vehicle-side switching unit 116 switches the setting of the vehicle control device 110*a*. When the acquired first vehicle identification information VI1 includes the non-unique information without including the unique information, the vehicle-side switching unit 116 performs the following process. In this case, the vehicle-side switching unit 116 causes the vehicle communication device 130*a* to recognize the vehicle 100*a* specified by the unique information included in the second vehicle identification information VI2 acquired from the remote control device 200*a*, that is, used for remote control of the target vehicle 100*t*, among the plurality of vehicle 100*a* specified by the second vehicle identification information VI2 stored in the third memory 132*a*. Accordingly, the vehicle-side switching unit 116 switches the setting of the vehicle communication device 130*a*.

The vehicle communication device 130*a* includes a processor 131*a*, a third memory 132*a*, an input/output interface 133, an internal bus 134, and an external monitor 135. The processor 131*a* executes the program PG3*a* stored in the third memory 132*a* to realize various functions including a generation unit 138*a* and a function as a display control unit 139*a*.

The generation unit 138*a* generates QR code as the mark MA differently depending on whether or not the second vehicle identification information VI2 of the non-target vehicle 100*n* is written in the third memory 132*a*.

When the second vehicle identification information VI2 of the non-target vehicle 100*n* is not written and the second vehicle identification information VI2 of the target vehicle 100*t* is written in the third memory 132*a*, the generation unit 138*a* performs the following process. The generation unit 138*a* generates a QR code representing the second vehicle identification information VI2 by using the second vehicle identification information VI2 written in the third memory 132*a* by the remote control device 200*a*. That is, QR code is generated using the second vehicle identification information VI2 without using the first vehicle identification information VI1.

When the second vehicle identification information VI2 of the plurality of vehicle 100*a* is written in the third memory 132*a* and the setting of the vehicle communication device 130*a* is switched using the first vehicle identification information VI1 including the unique information, the generation unit 138*a* performs the following process. In this case, the generation unit 138*a* generates a QR code representing the first vehicle identification information VI1 including the unique information and the communication identification information CI of the vehicle communication device 130*a*. In other words, QR code is generated using at least the first vehicle identification information VI1.

When the second vehicle identification information VI2 of the plurality of vehicle 100*a* is written in the third memory 132*a* and the first vehicle identification information VI1 includes the non-unique information without including the unique information, the generation unit 138*a* performs the following process. The generation unit 138*a* generates a QR code representing access information for causing the vehicle communication device 130*a* to access. The display control unit 139*a* causes the external monitor 135 to display a QR code representing the access information. This enables the remote control device 200 to send the second vehicle identification information VI2 of the target vehicle 100*t* including the unique information to the host vehicle 100*a*.

When the vehicle identification information VI of the plurality of vehicle 100*a* is written in the third memory 132*a* and the setting of the vehicle communication device 130*a* is switched using the second vehicle identification information VI2 including the unique information, the generation unit 138*a* performs the following process. The generation unit 138*a* generates, among the second vehicle identification information VI2 of the plurality of vehicle 100*a* stored in the third memory 132*a*, a QR code representing the second vehicle identification information VI2 including the unique information corresponding to the unique information acquired from the remote control device 200*a*. That is, QR code is generated using the second vehicle identification information VI2 without using the first vehicle identification information VI1.

Figure 7:
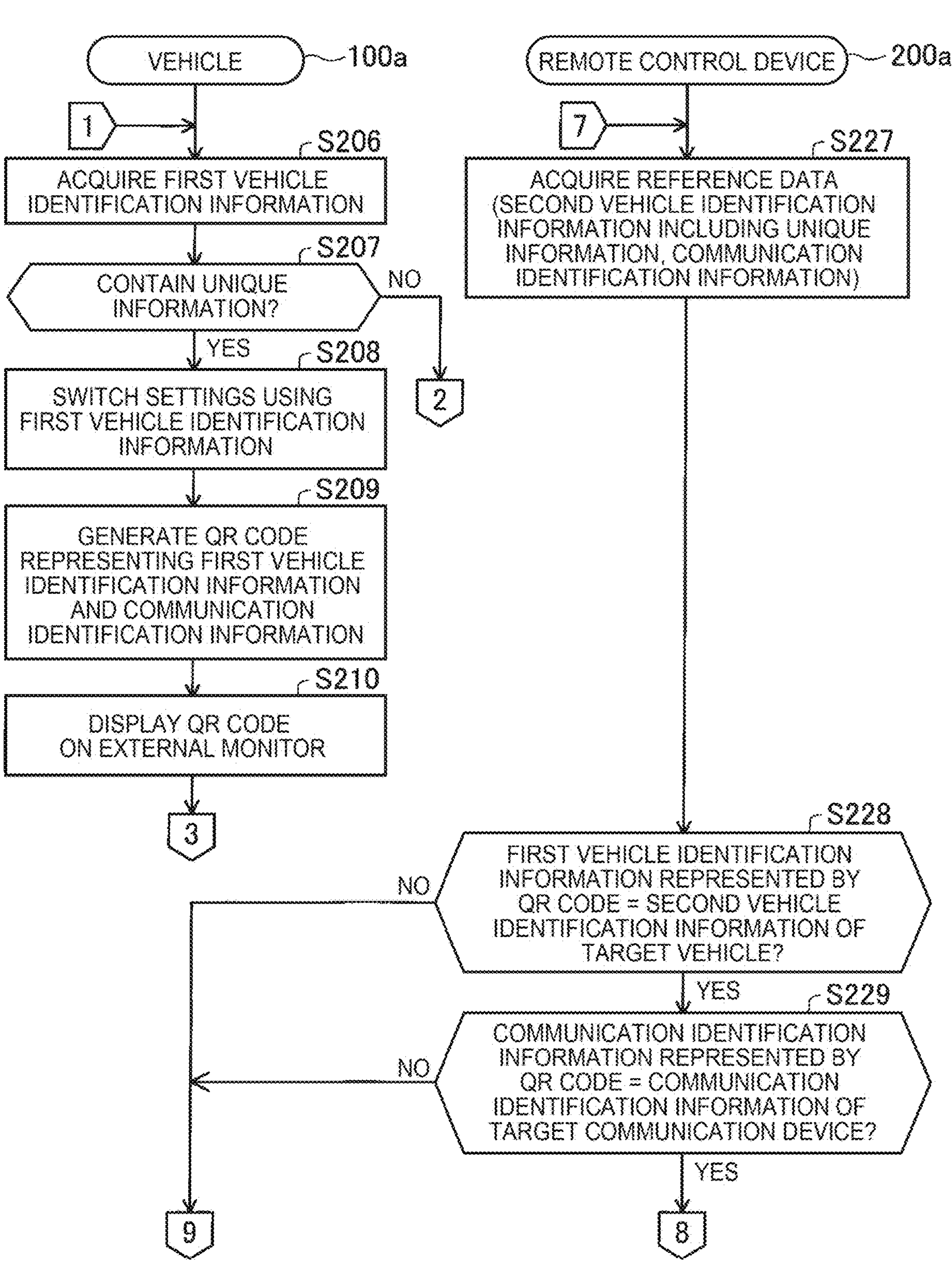
FIG. 7 is a second flowchart illustrating a determination method according to the second embodiment.
Figure 8:
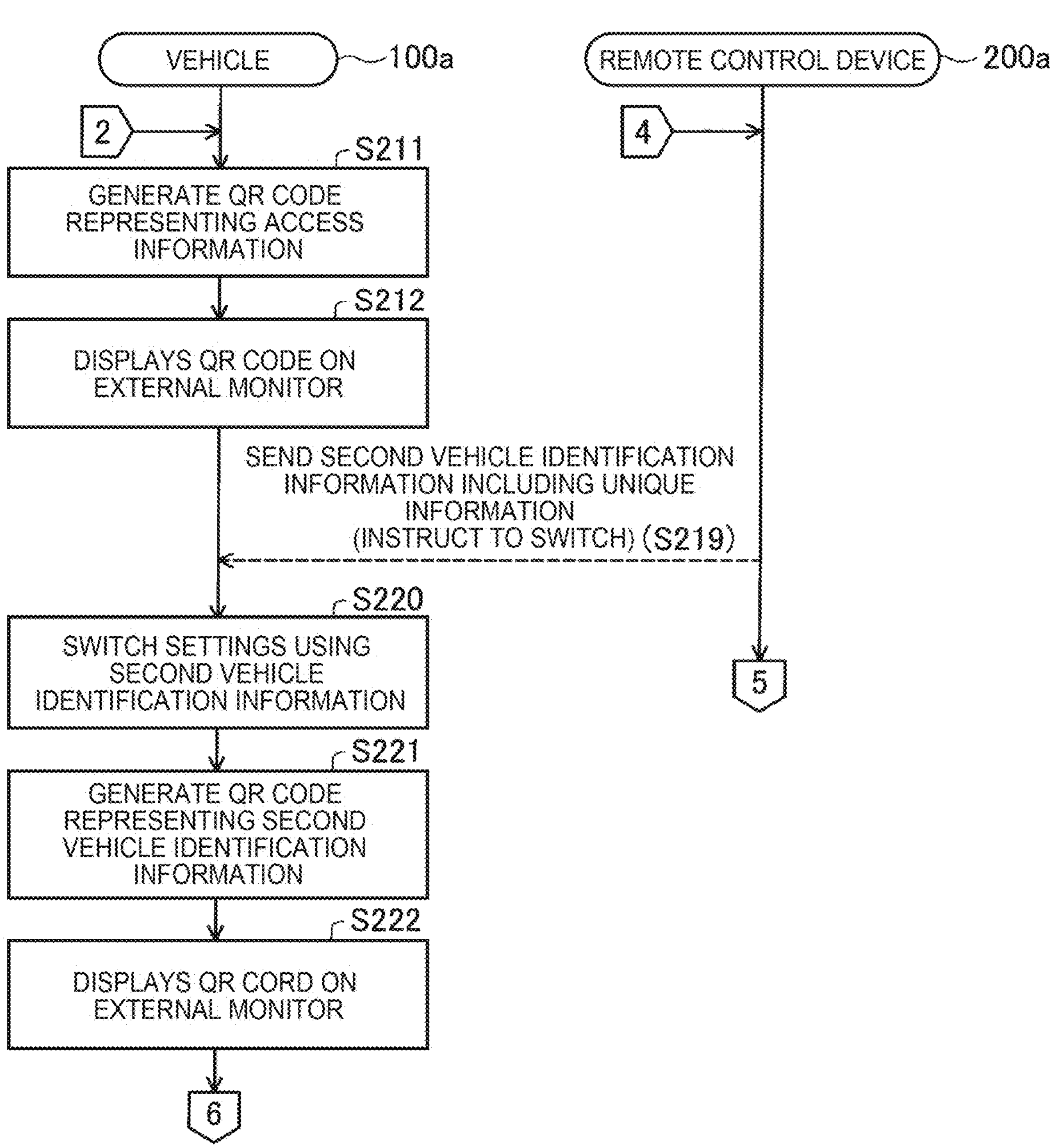
FIG. 8 is a third flowchart illustrating a determination method according to the second embodiment.

FIG. 6 is a first flowchart illustrating a determination method according to the second embodiment. FIG. 7 is a second flowchart illustrating a determination method according to the second embodiment. FIG. 8 is a third flowchart illustrating a determination method according to the second embodiment. The processes illustrated in FIGS. 6 to 8 are performed, for example, prior to starting the travel of the target vehicle 100*t*. Note that the processes illustrated in FIGS. 6 to 8 may be performed at a predetermined cycle while the target vehicle 100*t* is traveling.

As illustrated in FIG. 6, when the writing unit 215 of the remote control device 200*a* does not write the second vehicle identification information VI2 to the third memory 132 (S201: Yes), the writing unit 215 performs S202. In S202, the writing unit 215 writes the second vehicle identification information VI2 including the unique information, which is the second vehicle identification information VI2 of one or more vehicle 100*t* including the target vehicle 100*a*, to the third memory 132*a*.

When the second vehicle identification information VI2 of the target vehicle 100*t* is written in the third memory 132*a* without writing the second vehicle identification information VI2 of the non-target vehicle 100*n* (S203: Yes), the generation unit 138*a* of the vehicle communication device 130*a* performs S204. In S204, the generation unit 138*a* generates a QR code representing the second vehicle identification information VI2 using the second vehicle identification information VI2 written in the third memory 132*a* by the remote control device 200*a*. In S205, the display control unit 139*a* causes the external monitor 135 to display a QR code representing the second vehicle identification information VI2.

When the second vehicle identification information VI2 of the plurality of vehicle 100*a* is written in the third memory 132*a* (S203: No), the vehicle-side switching unit 116 of the vehicle control device 110*a* performs S206 illustrated in FIG. 7. In S206, the vehicle-side switching unit 116 acquires the first vehicle identification information VI1.

When the acquired first vehicle identification information VI1 includes the unique information (S207: Yes), the vehicle-side switching unit 116 performs S208. In S208, the vehicle-side switching unit 116 causes the vehicle communication device 130*a* to recognize that the vehicle is used for remote control of the host vehicle 100*a* among the plurality of vehicle 100*a* specified by the second vehicle identification information VI2 stored in the third memory 132*a*. Accordingly, the vehicle-side switching unit 116 switches the setting of the vehicle communication device 130*a* using the first vehicle identification information VI1 including the unique information. In S209, the generation unit 138*a* of the vehicle communication device 130*a* generates a QR code representing the first vehicle identification information VI1 including the unique information and the communication identification information CI. In S210, the display control unit 139*a* causes the external monitor 135 to display a QR code representing the first vehicle identification information VI1 including the unique information and the communication identification information CI.

When the acquired first vehicle identification information VI1 includes the non-unique information without including the unique information (S207: No), the generation unit 138*a* of the vehicle communication device 130*a* performs S211 illustrated in FIG. 8. In S211, the generation unit 138 generates a QR code representing access information for causing the vehicle communication device 130*a* to access. In S212, the display control unit 139*a* causes the external monitor 135 to display QR code representing the access information.

As illustrated in FIG. 6, in S213, the actual data acquisition unit 211*a* of the remote control device 200*a* sends an image requesting signal for acquiring a captured image to the external camera 310 capable of capturing an image of an area in which the target vehicle 100*t* is scheduled to exist. The external camera 310 receives the image request signal and sends the captured image to the remote control device 200*a* in S214. In S215, the actual data acquisition unit 211*a* of the remote control device 200*a* searches for a QR code in the captured image. When a QR code is found in a captured image (S216: Yes), S217 of the actual data acquisition unit 211*a* decodes the found QR code in accordance with a predetermined code standard to acquire information represented by QR code. On the other hand, when QR code cannot be found in the captured image (S216: No), the control system 50*a* terminates this process.

When the actual data acquisition unit 211*a* acquires the access information represented by QR code (S218: Yes), the device-side switching unit 216 performs S219 illustrated in FIG. 8. In S219, the device-side switching unit 216 sends, as a switching instruction, the second vehicle identification information VI2 including the unique information and the second vehicle identification information VI2 of the target vehicle 100*t*, to the vehicle communication device 130*a* by using the access information represented by QR code. The vehicle-side switching unit 116 of the vehicle communication device 130*a* that has received the second vehicle identification information VI2 including the unique information performs S220. In S220, the vehicle-side switching unit 116 causes the vehicle communication device 130*a* to recognize that the vehicle is used for remote control of the target vehicle 100*t* among the plurality of vehicle 100*a* specified by the second vehicle identification information VI2 stored in the third memory 132*a*. Accordingly, the vehicle-side switching unit 116 switches the setting of the vehicle communication device 130*a* using the second vehicle identification information VI2 including the unique information. In S221, the generation unit 138*a* generates, among the second vehicle identification information VI2 of the plurality of vehicle 100*a* stored in the third memory 132*a*, a QR code representing the second vehicle identification information VI2 including the unique information corresponding to the unique information acquired from the remote control device 200*a*. In S222, the display control unit 139*a* causes the external monitor 135 to display QR code representing the access information.

As illustrated in FIG. 6, when the actual data acquisition unit 211*a* acquires the second vehicle identification information VI2 that is the second vehicle identification information VI2 represented by QR code and includes the unique information, the reference data acquisition unit 213*a* performs S223. In S223, the reference data acquisition unit 213*a* acquires the first vehicle identification information VI1 including the unique information as the reference data by using the access information of the target communication device 130*t*. In S224, the remote control unit 214*a* compares the second vehicle identification information VI2 represented by QR code with the first vehicle identification information VI1 acquired using the access information of the target communication device 130*t*. When the second vehicle identification information VI2 represented by QR code matches the first vehicle identification information VI1 acquired by using the access information of the target communication device 130*t* (S224: Yes), the remote control unit 214*a* determines as shown in S225. In S225, the remote control unit 214*a* can send an instruction to the target vehicle 100*t*, and thus determines that the target vehicle 100*t* is allowed to travel. When the second vehicle identification information VI2 represented by QR code does not coincide with the first vehicle identification information VI1 acquired by using the access information of the target communication device 130*t* (S224: No), the remote control unit 214*a* determines as shown in S226. In S226, since the remote control unit 214*a* cannot send an instruction to the target vehicle 100*t*, it is determined that the target vehicle 100*t* must not be caused to travel.

When the actual data acquisition unit 211*a* acquires the first vehicle identification information VI1 represented by QR code, the first vehicle identification information VI1 including the unique information, and the communication identification information CI represented by QR code, the reference data acquisition unit 213*a* performs S227 illustrated in FIG. 7. In S227, the reference data acquisition unit 213*a* acquires, as reference data, the second vehicle identification information VI2 that is the second vehicle identification information VI2 of the target vehicle 100*t* and includes the unique information, and the communication identification information CI of the target communication device 130*t*. In S228, the remote control unit 214*a* compares the first vehicle identification information VI1 represented by QR code with the second vehicle identification information VI2 of the target vehicle 100*t*. In S229, the remote control unit 214*a* compares the communication identification information CI represented by QR code with the communication identification information CI of the target communication device 130*t*. When the first vehicle identification information VI1 represented by QR code matches the second vehicle identification information VI2 of the target vehicle 100*t* (S228: Yes), and when the communication identification information CI represented by QR code matches the communication identification information CI of the target communication device 130*t* (S229: Yes), the remote control unit 214*a* can send an instruction to the target vehicle 100*t* as illustrated in S225 of FIG. 6, and thus determines that the target vehicle 100*t* may be caused to travel. On the other hand, as shown in FIG. 7, when at least one of the first vehicle identification information VI1 represented by QR code and the second vehicle identification information VI2 of the target vehicle 100*t* does not coincide with each other (S228: No), and when (S229: No) the communication identification information CI represented by QR code and the communication identification information CI of the target communication device 130*t* do not coincide with each other, the remote control unit 214*a* cannot send an instruction to the target vehicle 100*t* as shown in S226 of FIG. 6, and thus it is determined that the target vehicle 100*t* should not be driven.

According to the second embodiment, the remote control device 200*a* can write the second vehicle-identification information VI2 including the unique information into the third memory 132*a* by using the access information. Accordingly, the vehicle communication device 130*a* can perform the following process. In this case, the vehicle communication device 130*a* may generate the mark MA representing the second vehicle identification information VI2 using the second vehicle identification information VI2 acquired from the remote control device 200*a*. In this way, it is possible to generate the mark MA representing the vehicle identification information VI without acquiring the first vehicle identification information VI1 from the vehicle control device 110*a*.

Further, according to the second embodiment, when the second vehicle identification information VI2 of the plurality of vehicle 100*a* is written in the third memory 132*a* and the first vehicle identification information VI1 includes the unique information, the vehicle communication device 130*a* can perform the following process. In this case, the vehicle communication device 130*a* can generate the mark MA representing the first vehicle identification information VI1 using the first vehicle identification information VI1 without using the second vehicle identification information VI2.

Further, according to the second embodiment, when the second vehicle identification information VI2 of the plurality of vehicle 100*a* is written in the third memory 132*a* and the first vehicle identification information VI1 includes the non-unique information without including the unique information, the vehicle communication device 130*a* can perform the following process. The vehicle communication device 130*a* may generate a QR code representing the access information. The vehicle communication device 130*a* may obtain the second vehicle identification information VI2 including the unique information from the remote control device 200*a* by using QR code representing the access information. Accordingly, the vehicle communication device 130*a* can generate the mark MA representing the second vehicle identification information VI2 by using the second vehicle identification information VI2.

Further, according to the second embodiment, when the mark MA is generated using the second vehicle identification information VI2 without using the first vehicle identification information VI1 and the second vehicle identification information VI2 represented by the mark MA includes the unique information, the remote control device 200*a* can perform the following process. In this case, the remote control device 200*a* can acquire, as the actual data, the second vehicle identification information VI2 that is the second vehicle identification information VI2 represented by the mark MA and includes the unique information. The remote control device 200*a* may acquire the first vehicle-identification information VI1 including the unique information as the reference data corresponding to the actual data. The remote control device 200*a* compares the second vehicle identification information VI2 as the actual data with the first vehicle identification information VI1 as the reference data. Thus, the remote control device 200*a* can determine whether or not the instruction can be sent to the target vehicle 100*t* when the mark MA is generated using the second vehicle identification information VI2 and not using the first vehicle identification information VI1 and the second vehicle identification information VI2 represented by the mark MA includes the unique information.

Further, according to the second embodiment, when the first vehicle identification information VI1 is used to generate the mark MA and the first vehicle identification information VI1 represented by the mark MA includes the unique information, the remote control device 200*a* can perform the following process. In this case, the remote control device 200*a* can acquire, as the actual data, the first vehicle identification information VI1 that is the first vehicle identification information VI1 represented by the mark MA and includes the unique information. The remote control device 200*a* may acquire the second vehicle-identification information VI2 including the unique information as the reference data corresponding to the actual data. The remote control device 200*a* compares the first vehicle identification information VI1 as the actual data with the second vehicle identification information VI2 as the reference data. Thus, the remote control device 200*a* can determine whether or not an instruction can be sent to the target vehicle 100*t* when the mark MA is generated using at least the first vehicle identification information VI1 and the first vehicle identification information VI1 represented by the mark MA includes the unique information.

C. Third Embodiment

FIG. 9 is a block diagram illustrating a configuration of a control system 50*b* according to a third embodiment. The control system 50*b* includes one or more vehicle 100*b*, a remote control device 200*b* as a control device, and one or more external cameras 310. The present embodiment differs from the first embodiment in the items of the vehicle identification information VI represented by the mark MA and the determination methods for determining whether an instruction can be sent to the target vehicle 100*t*. Other configurations of the control system 50*b* are the same as those of the first embodiment unless otherwise described. The same components as those in the first embodiment are denoted by the same reference numerals, and the description thereof is omitted.

The remote control device 200*b* realizes various functions including a function of the production-instruction server 210*b* and a function of the self-propelled server 220*b*. The production-instruction server 210*b* sends, to the self-propelled server 220*b*, a travel instruction for causing the target vehicle 100*t* to travel by remote control. The self-propelled server 220*b* causes the target vehicle 100*t* to travel when a travel instruction for causing the target vehicle 100*t* to travel is received from the production-instruction server 210*b*.

The remote control device 200*b* includes a computer including a processor 201*b*, a second memory 202*b*, an input/output interface 203, and an internal bus 204. The processor 201*b* executes the program PG2*b* stored in the second memory 202*b* to realize various functions including the functions of the actual data acquisition unit 211*b*, the reference data acquisition unit 213*b*, and the remote control unit 214*b*.

When the mark MA is generated using at least the first vehicle identification information VI1 and the first vehicle identification information VI1 represented by the mark MA includes the non-unique information without including the unique information, the actual data acquisition unit 211*b* performs the following process. In this case, the actual data acquisition unit 211*b* acquires, as the actual data, the non-unique information represented by the mark MA, that is, the first vehicle-identification information VI1 represented by the mark MA. Further, the actual data acquisition unit 211*b* acquires the unique information stored in the first memory 112 by accessing the first memory 112 using the access information represented by the mark MA as the actual data.

When the mark MA is generated using at least the first vehicle identification information VI1 and the first vehicle identification information VI1 represented by the mark MA includes the non-unique information without including the unique information, the reference data acquisition unit 213*b* performs the following process. In this case, the reference data acquisition unit 213*b* acquires, as the reference data, the second vehicle identification information VI2 including the unique information of the target vehicle 100*t* and the non-unique information of the same item as the non-unique information included in the first vehicle identification information VI1 acquired as the actual data among the non-unique information of the target vehicle 100*t*.

When the first vehicle identification information VI1 is used at least to generate the mark MA, and the first vehicle identification information VI1 represented by the mark MA includes the non-unique information without including the unique information, the remote control unit 214*b* performs the following process. In this case, the remote control unit 214*b* collates the non-unique information represented by the mark MA with the non-unique information of the target vehicle 100*t* acquired as the reference data in the second vehicle identification information VI2. Further, the remote control unit 214*b* collates the unique information acquired by accessing the first memory 112 using the access information represented by the mark MA with the unique information of the target vehicle 100*t* acquired as the reference data in the second vehicle identification information VI2. The non-specific information represented by the mark MA and the non-unique information of the second vehicle identification information VI2, when the non-unique information of the target vehicle 100*t* acquired as the reference data coincides with each other and the unique information acquired by accessing the first memory 112 using the access information represented by the mark MA is coincident with each other, and when the unique information of the target vehicle 100*t* acquired as the reference data among the second vehicle identification information VI2 coincides with each other, the remote control unit 214*b* determines as follows. In this case, the remote control unit 214*b* can send an instruction to the target vehicle 100*t*, and thus determines that the target vehicle 100*t* is allowed to travel. On the other hand, when it corresponds to at least one of a case where the non-unique information represented by the mark MA does not match the non-unique information of the second vehicle identification information VI2 and the non-unique information of the target vehicle 100*t* obtained as the reference data, and a case where the unique information obtained by accessing the first memory 112 using the access information represented by the mark MA does not match the unique information of the target vehicle 100*t* obtained as the reference data in the second vehicle identification information VI2, the remote control unit 214*b* determines as follows. In this case, the remote control unit 214*b* determines that the target vehicle 100*t* must not be caused to travel because the instruction cannot be sent to the target vehicle 100*t*.

The vehicle 100*b* includes a vehicle control device 110 for controlling each unit of the vehicle 100*b*, an actuator group 120 including one or more actuators driven under the control of the vehicle control device 110, and a vehicle communication device 130*b* for wirelessly communicating with an external device such as a remote control device 200*b*.

The vehicle communication device 130*b* includes a processor 131*b*, a third memory 132*b*, an input/output interface 133, an internal bus 134, and an external monitor 135. The processor 131*b* executes the program PG3*b* stored in the third memory 132*b* to realize various functions including the generation unit 138*b* and the function as the display control unit 139.

The generation unit 138*b* acquires the first vehicle identification information VI1 including the non-unique information from the vehicle control device 110 without including the unique information. Then, the generation unit 138*b* generates, as the mark MA, a QR code representing the first vehicle-identification information VI1 including the non-unique information without including the unique information.

Figure 10:
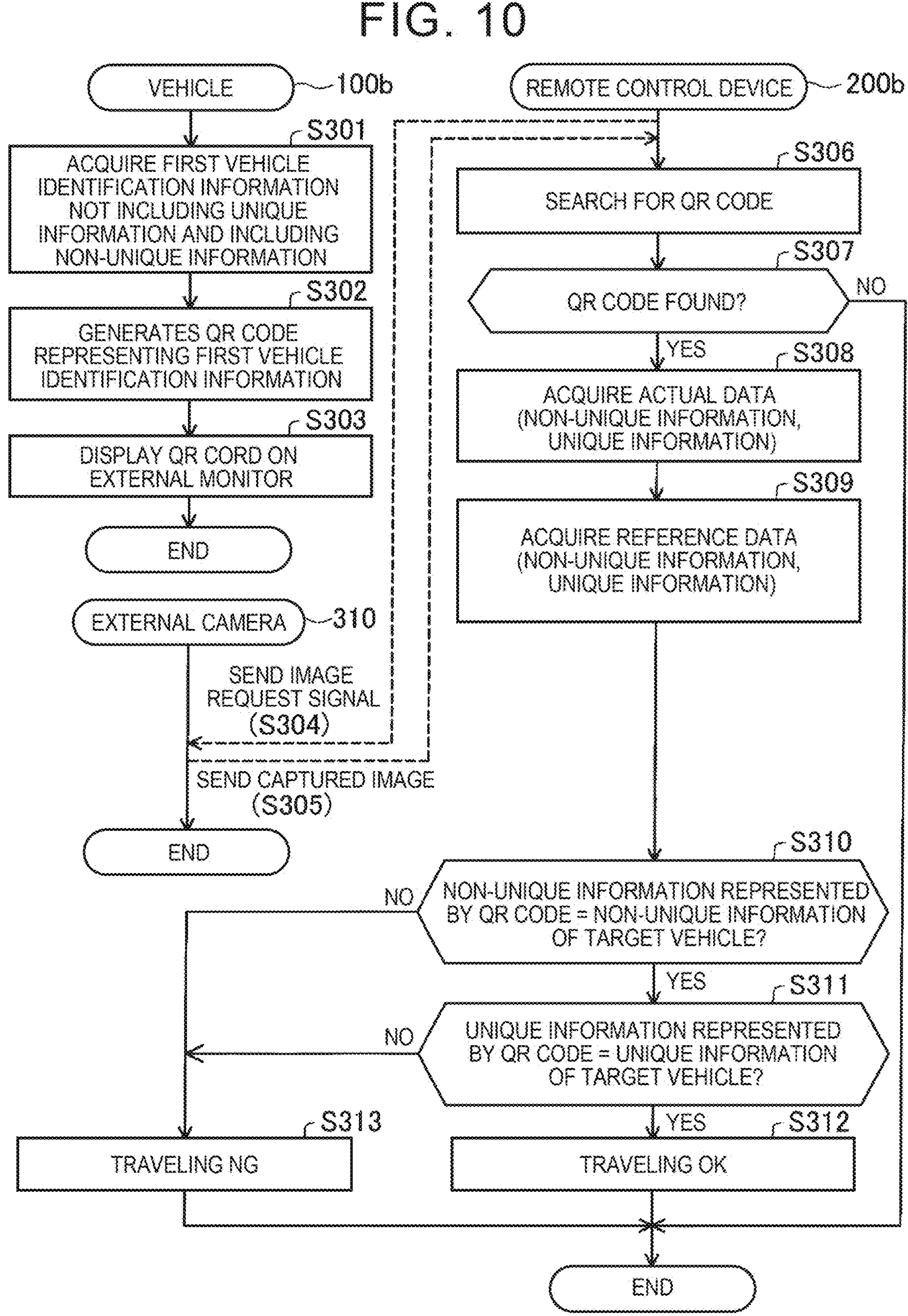
FIG. 10 is a flowchart illustrating a determination method according to the third embodiment.

FIG. 10 is a flowchart illustrating a determination method according to the third embodiment. The process illustrated in FIG. 10 is performed, for example, prior to starting the travel of the target vehicle 100*t*. Note that the flowchart illustrated in FIG. 10 may be performed at a predetermined cycle while the target vehicle 100*t* is traveling.

In S301, the generation unit 138*b* of the vehicle communication device 130 acquires the first vehicle identification information VI1 including the non-unique information without including the unique information from the vehicle control device 110. In S302, the generation unit 138*b* generates a QR code representing the acquired first vehicle identification information VI1. In S303, the display control unit 139 causes the external monitor 135 to display a QR code representing the first vehicle identification information VI1. The steps from S301 to S303 are performed for each 100*b* of vehicles.

In S304, the actual data acquisition unit 211*b* of the remote control device 200*b* sends an image requesting signal for acquiring a captured image to the external camera 310 capable of capturing an image of an area where the target vehicle 100*t* is scheduled to exist. The external camera 310 receives the image request signal and sends the captured image to the remote control device 200*b* in S305. In S306, the actual data acquisition unit 211*b* of the remote control device 200*b* searches for a QR code in the captured image. When a QR code is found in a captured image (S307: Yes), the actual data acquisition unit 211*b* decodes the found QR code according to a standard of a predetermined code in S308. As a result, the actual data acquisition unit 211*b* acquires, as the actual data, the non-unique information represented by the mark MA and the unique information acquired by accessing the first memory 112 using the access information represented by the mark MA. On the other hand, when QR code cannot be found in the captured image (S307: No), the control system 50*b* terminates this process.

In S309, the reference data acquisition unit 213*b* acquires, as the reference data, the second vehicle identification information VI2 including the unique information of the target vehicle 100*t* and the non-unique information of the same item as the non-unique information included in the first vehicle identification information VI1 acquired as the actual data among the non-unique information of the target vehicle 100*t*.

In S310, the remote control unit 214*b* compares the non-unique information represented by the mark MA with the non-unique information of the target vehicle 100*t* acquired as the reference data in the second vehicle identification information VI2. In S311, the remote control unit 214*b* collates the unique information acquired by accessing the first memory 112 using the access information represented by the mark MA with the unique information of the target vehicle 100*t* acquired as the reference data in the second vehicle identification information VI2. When the non-unique information represented by the mark MA matches the non-unique information of the target vehicle 100*t* acquired as the reference data among the second vehicle identification information VI2 (S310: Yes), and the unique information acquired by accessing the first memory 112 using the access information represented by the mark MA matches the unique information of the target vehicle 100*t* acquired as the reference data among the second vehicle identification information VI2 (S311: Yes), the remote control unit 214*b* determines as shown in S312. In S312, the remote control unit 214*b* can send an instruction to the target vehicle 100*t*, and thus determines that the target vehicle 100*t* is allowed to travel. On the other hand, in a case where the non-unique information represented by the mark MA does not coincide with the non-unique information of the target vehicle 100*t* acquired as the reference data among the second vehicle identification information VI2 (S310:

No), and in a case where the unique information acquired by accessing the first memory 112 using the access information represented by the mark MA and the unique information of the target vehicle 100*t* acquired as the reference data among the second vehicle identification information VI2 do not coincide with each other (S311: No), the remote control unit 214*b* determines as shown in S313. In S313, since the remote control unit 214*b* cannot send an instruction to the target vehicle 100*t*, it is determined that the target vehicle 100*t* must not be caused to travel.

According to the third embodiment, when the mark MA is generated using at least the first vehicle identification information VI1 and the first vehicle identification information VI1 represented by the mark MA includes the non-unique information without including the unique information, the remote control device 200*b* can perform the following process. Here, the remote control device 200*b* can use the non-unique information represented by the mark MA as the actual data. Further, the remote control device 200*b* can acquire the unique information stored in the first memory 112 by accessing the first memory 112 using the access information represented by the mark MA as the actual data. The remote control device 200*b* can acquire, as the reference data corresponding to the actual data, the second vehicle identification information VI2 including the unique information of the target vehicle 100*t* and the non-unique information of the same items as the non-unique information included in the first vehicle identification information VI1 acquired as the actual data among the non-unique information of the target vehicle 100*t*. The remote control device 200*b* can compare the non-unique information represented by the mark MA with the non-unique information of the target vehicle 100*t* obtained as the reference data in the second vehicle identification information VI2. The remote control device 200*b* can collate the unique information acquired by accessing the first memory 112 using the access information represented by the mark MA with the unique information of the target vehicle 100*t* acquired as the reference data in the second vehicle identification information VI2. Thus, the remote control device 200*b* can determine whether or not an instruction can be sent to the target vehicle 100*t* when the mark MA is generated using at least the first vehicle identification information VI1 and the first vehicle identification information VI1 represented by the mark MA includes the non-unique information without including the unique information.

D. Fourth Embodiment

FIG. 11 is a block diagram illustrating a configuration of a control system 50*v* according to a fourth embodiment. The vehicle 100*v* according to the present embodiment can further travel by autonomous control of the vehicle 100*v*. Other configurations are the same as those of the first embodiment unless otherwise described.

In the present embodiment, the processor 111*v* of the vehicle control device 110*v* functions as the vehicle control unit 115*v* by executing the program PG1*v* stored in the memory 112*v*. The vehicle control unit 115*v* can cause the vehicle 100*v* to travel by autonomous control by acquiring an output result from the sensor, generating a travel control signal using the output result, and outputting the generated travel control signal to operate the actuator group 120. In the present embodiment, in addition to the program PG1*v*, the detection-model DM and the reference-path RR are stored in advance in the memory 112*v*.

Figure 12:
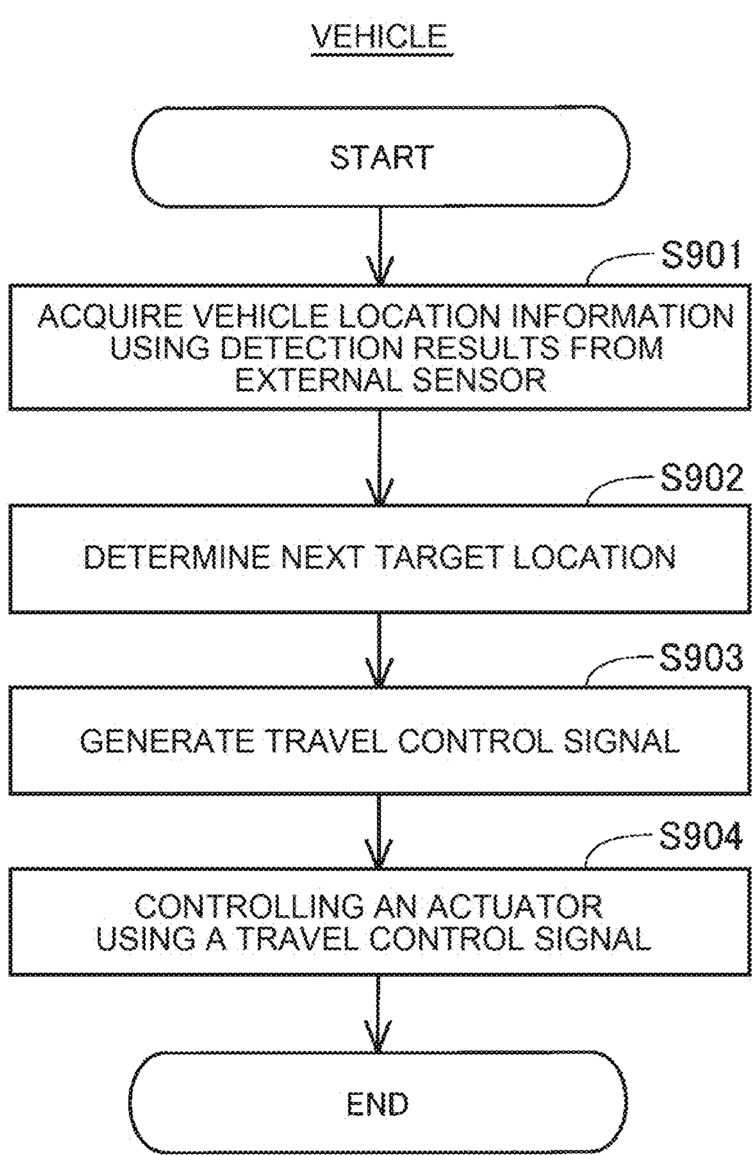
FIG. 12 is a flowchart illustrating a processing procedure when the vehicle travels by autonomous control.

FIG. 12 is a flow chart showing a process sequence of travel control when the vehicle 100*v* travels by autonomous control. In the flowchart illustrated in FIG. 12, for example, 100*v* is repeatedly performed at a predetermined cycle during a time in which the vehicle travels by autonomous control.

In S901, the vehicle control unit 115*v* of the vehicle control device 110*v* acquires the vehicle position information using the detection result outputted from the camera as the external sensor 300. In S902, the vehicle control unit 115*v* determines a target position to which the vehicle 100*v* is to be directed next. In S903, the vehicle control unit 115*v* generates a travel control signal for causing the vehicle 100*v* to travel toward the determined target position. In S904, the vehicle control unit 115*v* controls the actuator group 120 by using the generated travel control signal, thereby causing the vehicle 100*v* to travel in accordance with the parameter represented by the travel control signal. The processor 111*v* repeats acquiring the vehicle position information, determining the target position, generating the travel control signal, and controlling the actuator at a predetermined cycle. According to the control system 50*v* of the present embodiment, the vehicle 100*v* can be driven by the autonomous control of the vehicle 100*v* without remotely controlling the vehicle 100*v* by the remote control device 200.

E. Other Embodiments

E-1. Another Embodiment 1

At least some functions of the remote control devices 200, 200*a*, 200*b* may be one function of the vehicles 100, 100*a*, 100*v* and may be one function of the external sensor 300. Also, at least some of the functions of the vehicles 100, 100*a*, 100*v* may be a function of the remote control device 200, 200*a*, 200*b*. For example, the generation units 138, 138*a*, 138*b* may be a function of the remote control devices 200, 200*a*, 200*b*. The generation units 138, 138*a*, 138*b* generates the mark MA using the second vehicle identification information VI2 of the target vehicle 100*t* stored in the second memory 202, 200*a*, 200*b*, for example. Then, the generation unit 138, 138*a*, 138*b* sends the generated image data of the mark MA to the vehicle communication device 130, 130*a*, 130*b*. The display control unit 139, 139*a* of the vehicle communication device 130, 130*a*, 130*b* causes the external monitor 135 to display the image data of the mark MA received from the remote control device 200, 200*a*, 200*b*. Even in such a configuration, the control system 50, 50*a*, 50*b* can generate mark MA representing the vehicle identification information VI and display the generated mark MA on the external monitor 135.

E-2. Another Embodiment 2

In each of the above-described embodiments, the external sensor 300 is not limited to a camera, and may be, for example, a distance measuring device. The distance measuring device is, for example, a LiDAR (Light Detection And Ranging). The external sensor 300 may be a three-dimensional point cloud representing 100, 100*a*, 100*b*, 100*v* of vehicles. In this case, the server 200, 200*a*, 200*b* and the vehicle 100, 100*a*, 100*b*, 100*v* may acquire the vehicle position information by template matching using the three-dimensional point cloud data and the reference-point cloud data prepared in advance.

E-3. Another Embodiment 3

In the first embodiment to the third embodiment, 200, 200*a*, 200*b* performs a process from acquiring the vehicle position information to generating the travel control signal. On the other hand, the vehicle 100, 100*a*, 100*b* may perform at least a part of the process from acquiring the vehicle position information to generating the travel control signal. For example, the following forms (1) to (3) may be used.

(1) The server 200, 200*a*, 200*b* may acquire the vehicle position information, determine a target position to which the vehicle 100, 100*a*, 100*b* should be directed next, and generate a route from the current position of the vehicle 100, 100*a*, 100*b* represented in the acquired vehicle position information to the target position. The server 200, 200*a*, 200*b* may generate a route to a target position between the current location and the destination, or may generate a route to the destination. 200, 200*a*, 200*b* may send the generated route to the vehicles 100. The vehicle 100, 100*a*, 100*b* may generate a travel control signal so that the vehicle 100, 100*a*, 100*b* travels on the route received from the server 200, 200*a*, 200*b*, and control the actuator group 120 using the generated travel control signal.

(2) The server 200, 200*a*, 200*b* may acquire the vehicle position information and send the acquired vehicle position information to the vehicle 100, 100*a*, 100*b*. The vehicle 100, 100*a*, 100*b* may determine a target position to which the vehicle 100 should be directed next, generate a route from the current position of the vehicle 100, 100*a*, 100*b* represented in the received vehicle position information to the target position, generate a travel control signal so that the vehicle 100, 100*a*, 100*b* travels on the generated route, and control the actuator group 120 using the generated travel control signal.

(3) In the above embodiments (1) and (2), an internal sensor may be mounted on the vehicles 100, 100*a*, 100*b*, and a detection result outputted from the internal sensor may be used for at least one of generation of a route and generation of a travel control signal. The inner sensor is a sensor mounted on the vehicles 100, 100*a*, 100*b*. The inner sensor may include, for example, a sensor that detects a motion state of the vehicle 100, 100*a*, 100*b*, a sensor that detects an operation state of each unit of the vehicle 100, 100*a*, 100*b*, and a sensor that detects an environment around the vehicle 100, 100*a*, 100*b*. Specifically, the inner sensor may include, for example, a camera, a LiDAR, a millimeter-wave radar, an ultrasonic sensor, a GPS sensor, an accelerometer, a gyroscope, and the like. For example, in the above aspect (1), the server 200, 200*a*, 200*b* may acquire the detection result of the internal sensor and reflect the detection result of the internal sensor in the path when generating the path. In the aspect (1), the vehicle 100, 100*a*, 100*b* may acquire the detection result of the internal sensor and reflect the detection result of the internal sensor in the travel control signal when generating the travel control signal. In the aspect (2), the vehicle 100, 100*a*, 100*b* may acquire the detection result of the internal sensor and reflect the detection result of the internal sensor in the path when generating the path. In the aspect (2), the vehicle 100, 100*a*, 100*b* may acquire the detection result of the internal sensor and reflect the detection result of the internal sensor in the travel control signal when generating the travel control signal.

E-4. Other Embodiment 4

In the fourth embodiment, an internal sensor may be mounted on the vehicle 100*v*, and a detection result outputted from the internal sensor may be used for at least one of generation of a route and generation of a travel control signal. For example, the vehicle 100*v* may acquire the detection result of the internal sensor and reflect the detection result of the internal sensor in the route when generating the route. The vehicle 100*v* may acquire the detection result of the internal sensor and reflect the detection result of the internal sensor in the travel control signal when generating the travel control signal.

E-5. Another Embodiment 5

In the fourth embodiment, the vehicle 100*v* acquires the vehicle position information using the detection result of the external sensor 300. On the other hand, an internal sensor is mounted on the vehicle 100*v*, and the vehicle 100*v* may acquire the vehicle position information using the detection result of the internal sensor, determine a target position to which the vehicle 100*v* should be directed next, generate a route from the current position of the vehicle 100*v* represented in the acquired vehicle position information to the target position, generate a travel control signal for traveling on the generated route, and control the actuator group 120 using the generated travel control signal. In this case, the vehicle 100*v* can travel without using the detection result of the external sensor 300 at all. The vehicle 100*v* may acquire the target arrival time and the traffic jam information from the outside of the vehicle 100*v* and reflect the target arrival time and the traffic jam information on at least one of the route and the travel control signal.

E-6. Another Embodiment 6

In the embodiments from the first embodiment to the third embodiment, the server 200, 200*a*, 200*b* automatically generates travel control signals to be sent to the vehicle 100, 100*a*, 100*b*. On the other hand, the server 200 may generate a travel control signal to be sent to the vehicle 100, 100*a*, 100*b* in accordance with an operation of an external operator located outside the vehicle 100, 100*a*, 100*b*. For example, an external operator may operate a control device including a display for displaying captured images outputted from the external sensor 300, a steering for remotely controlling the vehicle 100, 100*a*, 100*b*, an accelerator pedal, a brake pedal, and a communication device for communicating with the server 200, 200*a*, 200*b* through wired communication or wireless communication, and the server 200, 200*a*, 200*b* may generate a travel control signal corresponding to an operation applied to the control device.

E-7. Other Embodiment 7

In the above-described embodiments, the vehicle 100, 100*a*, 100*b*, 100*v* may have a configuration that can be moved by unmanned driving, and may be, for example, in the form of a platform that includes the configuration described below. Specifically, the vehicle 100, 100*a*, 100*b*, 100*v* may include at least a vehicle control device 110, 110*a*, 110*v* and an actuator group 120 in order to perform three functions of "running," "turning," and "stopping" by unmanned driving. When the vehicle 100, 100*a*, 100*b*, 100*v* acquires information from the outside for unmanned driving, the vehicle 100, 100*a*, 100*b*, 100*v* may further include a communication device 130, 130*a*, 130*b*. That is, in the vehicle 100, 100*a*, 100*b*, 100*v* that can be moved by unmanned driving, at least a part of an interior component such as a driver's seat or a dashboard may not be mounted, at least a part of an exterior component such as a bumper or a fender may not be mounted, and a body shell may not be mounted. In this case, the remaining components such as the body shell may be mounted on the vehicle 100, 100_a_, 100_b_, 100_v_ before the vehicle 100, 100_a_, 100_b_, 100_v_ is shipped from the factory FC, or the remaining components such as the body shell may be mounted on the vehicle 100, 100_a_, 100_b_, 100_v_ after the vehicle 100, 100_a_, 100_b_, 100_v_ is shipped from the factory FC while the remaining components such as the body shell are not mounted on the vehicle 100, 100_a_, 100_b_, 100_v_. Each component may be attached from any direction, such as the upper, lower, front, back, right or left side of the vehicle 100, 100_a_, 100_b_, 100_v_, may be attached from the same direction, each may be attached from different directions. It should be noted that the position determination can be performed in the same manner as in the vehicles 100, 100_a_, 100_b_, 100_v_ according to the first embodiment.

E-8. Another Embodiment 8

The vehicles 100, 100_a_, 100_b_, 100_v_ may be manufactured by combining a plurality of modules. Modules refer to units composed of one or more components grouped according to the configuration and function of the vehicles 100, 100_a_, 100_b_, 100_v_. For example, the platform of the vehicle 100, 100_a_, 100_b_, 100_v_ may be manufactured by combining a front module that constitutes a front portion of the platform, a central module that constitutes a central portion of the platform, and a rear module that constitutes a rear portion of the platform. The number of modules constituting the platform is not limited to three, and may be two or less or four or more. Also, in addition to or instead of the platform, parts of the vehicles 100, 100_a_, 100_b_, 100_v_ that differ from the platform may be modularized. Further, the various modules may include any exterior parts such as bumpers and grills, and any interior parts such as sheets and consoles. In addition, the present disclosure is not limited to vehicles 100, 100_a_, 100_b_, 100_v_, and a moving object of any aspect may be manufactured by combining a plurality of modules. Such a module may be manufactured, for example, by joining a plurality of parts by welding, a fixture, or the like, or may be manufactured by integrally molding at least a part of the module as one part by casting. Molding techniques for integrally molding at least a portion of a module as one part are also referred to as gigacasting or megacasting. By using the gigacasting, each part of the moving object, which has been conventionally formed by joining a plurality of parts, can be formed as one part. For example, the front module, the central module, and the rear module described above may be manufactured using gigacasting.

E-9. Other Embodiment 9

Transporting the vehicle 100, 100_a_, 100_b_, 100_v_ by using the traveling of the vehicle 100, 100_a_, 100_b_, 100_v_ by the unmanned driving is also referred to as "self-propelled conveyance". A configuration for realizing self-propelled conveyance is also referred to as a "vehicle remote control autonomous traveling conveyance system". Further, a production method of producing vehicles 100, 100_a_, 100_b_, 100_v_ by using self-propelled conveyance is also referred to as "self-propelled production". In self-propelled manufacturing, for example, at least a part of the conveyance of the vehicle 100, 100_a_, 100_b_, 100_v_ is realized by self-propelled conveyance in a factory FC that manufactures the vehicle 100, 100_a_, 100_b_, 100_v_.

E-10. Other Embodiment 10

In each of the above-described embodiments, some or all of the functions and processes implemented in software may be implemented in hardware. In addition, some or all of the functions and processes implemented in hardware may be implemented in software. For example, various circuits such as an integrated circuit and a discrete circuit may be used as hardware for realizing various functions in the above-described embodiments.

The present disclosure is not limited to each of the above embodiments, and can be realized by various configurations without departing from the spirit thereof. For example, the technical features of the embodiments corresponding to the technical features in the respective embodiments described in Summary can be appropriately replaced or combined in order to solve some or all of the above-described problems or to achieve some or all of the above-described effects. Further, when the technical features are not described as essential in the present specification, these can be deleted as appropriate.

What is claimed is:

1. A control device, comprising a processor configured to:

acquire actual data on either or both of a mark displayed on an external monitor mounted on a moving object that is movable by remote control and acquired information acquired using the mark, the acquired information including identification information for identifying the moving object;

acquire reference data corresponding to the actual data; and remotely control the moving object and perform different processes related to movement of the moving object between when the actual data and the reference data match each other and when the actual data and the reference data do not match each other, wherein the identification information is stored in each of a first memory of a moving object control device mounted on the moving object and a second memory of the control device, when the mark is generated using at least first identification information that is the identification information stored in the first memory, the first identification information represented by the mark includes unique information unique to the moving object, and the processor acquires the first identification information represented by the mark as the actual data, and at least second identification information that is the identification information stored in the second memory as the reference data, the second identification information including the unique information, when the mark is generated using the second identification information and not using the first identification information, the second identification information represented by the mark includes the unique information, and the processor acquires the second identification information represented by the mark as the actual data, and at least the first identification information including the unique information as the reference data, and when the mark is generated using at least the first identification information, the first identification information represented by the mark does not include the unique information and includes non-unique information other than the unique information, and the processor acquires the non-unique information included in the first identification information represented by the mark and the unique information acquired using access information represented by the mark as the actual data and, at least the second identification information including the unique information and the non-unique information as the reference data, the access information being information for accessing the first memory.

2. The control device according to claim 1, wherein an item of the first identification information that is the identification information stored in the first memory is set according to a manufacturing process being performed on the moving object, the processor is further configured to acquire process information indicating the manufacturing process being performed on the moving object, and when the processor acquires, as the actual data, the first identification information represented by the mark, the processor acquires, as the reference data, at least information on the item according to the manufacturing process identified by the process information out of the second identification information that is the identification information stored in the second memory.

3. A control system, comprising:

a moving object that is movable by remote control; and a control device installed at a place different from the moving object, wherein the moving object includes a communication device and a moving object control device, the communication device includes a first processor configured to generate a mark using at least identification information for identifying the moving object, the identification information being information acquired from either or both of the control device and the moving object control device, and an external monitor configured to display the mark, and the control device includes a second processor configured to acquire actual data on either or both of the mark displayed on the external monitor and acquired information acquired using the mark, the acquired information including the identification information, acquire reference data corresponding to the actual data, and remotely control the moving object and perform different processes related to movement of the moving object between when the actual data and the reference data match each other and when the actual data and the reference data do not match each other, wherein the identification information is stored in each of a first memory of the moving object control device and a second memory of the control device, when the mark is generated using at least first identification information that is the identification information stored in the first memory, the first identification information represented by the mark includes unique information unique to the moving object, and the second processor acquires the first identification information represented by the mark as the actual data, and at least second identification information that is the identification information stored in the second memory as the reference data, the second identification information including the unique information, when the mark is generated using the second identification information and not using the first identification information, the second identification information represented by the mark includes the unique information, and the second processor acquires the second identification information represented by the mark as the actual data, and at least the first identification information including the unique information as the reference data, and when the mark is generated using at least the first identification information, the first identification information represented by the mark does not include the unique information and includes non-unique information other than the unique information, and the second processor acquires the non-unique information included in the first identification information represented by the mark and the unique information acquired using access information represented by the mark as the actual data, and at least the second identification information including the unique information and the non-unique information as the reference data, the access information being information for accessing the first memory.

4. A control system, comprising:

a moving object that is movable by remote control; and a control device installed at a place different from the moving object, wherein the moving object includes a communication device, the communication device including an external monitor configured to display a mark acquired from the control device, and the control device includes a memory configured to store identification information for identifying the moving object, and a processor configured to:

generate the mark using at least the identification information stored in the memory;

acquire actual data on either or both of the mark displayed on the external monitor and acquired information acquired using the mark, the acquired information including the identification information;

acquire reference data corresponding to the actual data; and remotely control the moving object and perform different processes related to movement of the moving object between when the actual data and the reference data match each other and when the actual data and the reference data do not match each other, wherein the identification information is stored in each of a first memory of a moving object control device mounted on the moving object and a second memory of the control device, when the mark is generated using at least first identification information that is the identification information stored in the first memory, the first identification information represented by the mark includes unique information unique to the moving object, and the processor acquires the first identification information represented by the mark as the actual data, and, at least second identification information that is the identification information stored in the second memory as the reference data, the second identification information including the unique information, when the mark is generated using the second identification information and not using the first identification information, the second identification information represented by the mark includes the unique information, and the processor acquires the second identification information represented by the mark as the actual data, and at least the first identification information including the unique information as the reference data, and when the mark is generated using at least the first identification information, the first identification information represented by the mark does not include the unique information and includes non-unique information other than the unique information, and the processor acquires the non-unique information included in the first identification information represented by the mark and the unique information acquired using access information represented by the mark as the actual data, and at least the second identification information including the unique information and the non-unique information as the reference data, the access information being information for accessing the first memory.

* * * * *